United States Patent
Sato et al.

(10) Patent No.: US 8,106,954 B2
(45) Date of Patent: Jan. 31, 2012

(54) IMAGING APPARATUS AND METHOD THAT REDUCES ILLUMINATION VARIATIONS BY CONVERTING A LUMINANCE VALUE OF A TARGET PIXEL DEPENDING ON AN AVERAGE LUMINANCE VALUE OF PIXELS IN THE VICINITY OF THE TARGET PIXEL

(75) Inventors: Daisuke Sato, Osaka (JP); Haruo Yamashita, Osaka (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 12/177,644

(22) Filed: Jul. 22, 2008

(65) Prior Publication Data

US 2009/0033753 A1 Feb. 5, 2009

(30) Foreign Application Priority Data

Jul. 31, 2007 (JP) ................................. 2007-198494
Apr. 1, 2008 (JP) ................................. 2008-094986
Apr. 11, 2008 (JP) ................................. 2008-103043

(51) Int. Cl.
*H04N 5/225* (2006.01)

(52) U.S. Cl. .................. 348/217.1; 348/234; 348/222.1; 348/348; 348/371

(58) Field of Classification Search ............... 348/217.1, 348/222.1, 348, 371, 234
See application file for complete search history.

(56) References Cited

U.S. PATENT DOCUMENTS

| | | | |
|---|---|---|---|
| 2003/0043290 A1* | 3/2003 | Sasaki | 348/345 |
| 2004/0041920 A1* | 3/2004 | Mizukami et al. | 348/222.1 |
| 2005/0147404 A1* | 7/2005 | Takeuchi | 396/157 |
| 2007/0248343 A1* | 10/2007 | Yamamoto | 348/240.3 |

FOREIGN PATENT DOCUMENTS

| | | |
|---|---|---|
| JP | 2001-352440 | 12/2001 |
| JP | 2006-24176 | 1/2006 |
| WO | 97/45809 | 12/1997 |

* cited by examiner

*Primary Examiner* — Gevell Selby
(74) *Attorney, Agent, or Firm* — Wenderoth, Lind & Ponack, L.L.P.

(57) ABSTRACT

An imaging apparatus estimates a distance based on a reflectance value of a subject estimated with improved precision. An illumination unit illuminates a subject with illumination light. An imaging unit captures a plurality of images each under a different condition of the illumination unit. An illumination light element obtaining unit obtains an image formed with an element of the illumination light from the plurality of images. A reflectance estimation unit eliminates illumination variations from one of the plurality of images or from the image formed with the illumination light element, and estimates a reflectance of the subject corresponding to each pixel. A distance information estimation unit estimates a distance to the subject corresponding to each pixel based on the image formed with the illumination light element and the reflectance of the subject.

17 Claims, 11 Drawing Sheets

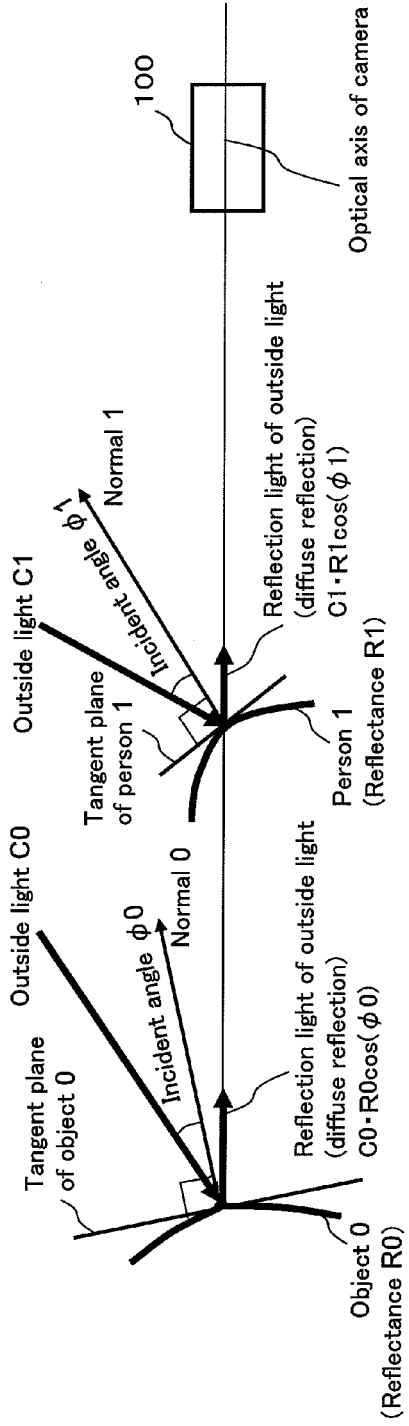
*Fig. 7A* Reflection light of outside light (diffuse reflection)
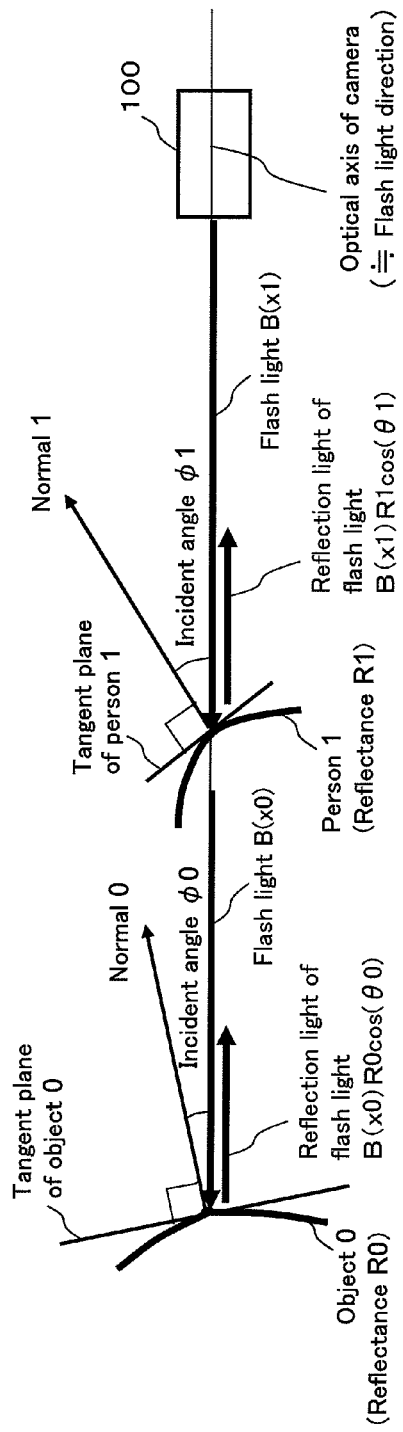
*Fig. 7B* Reflection light of flash light (diffuse reflection)

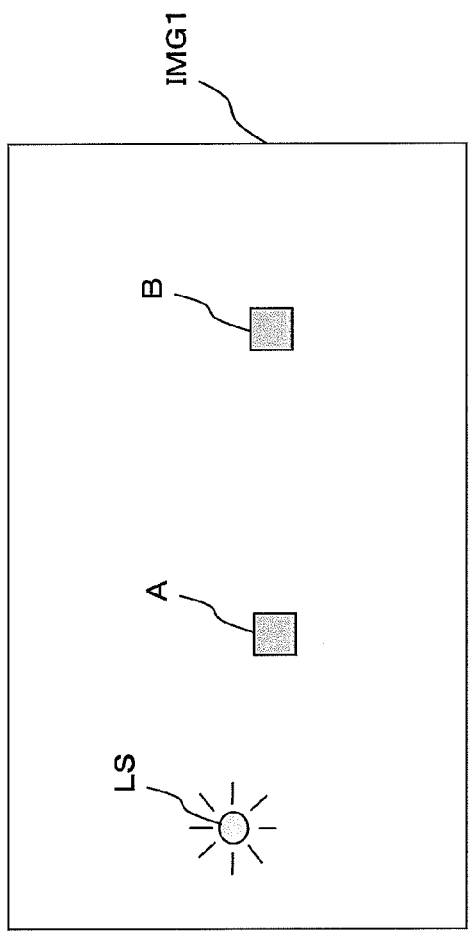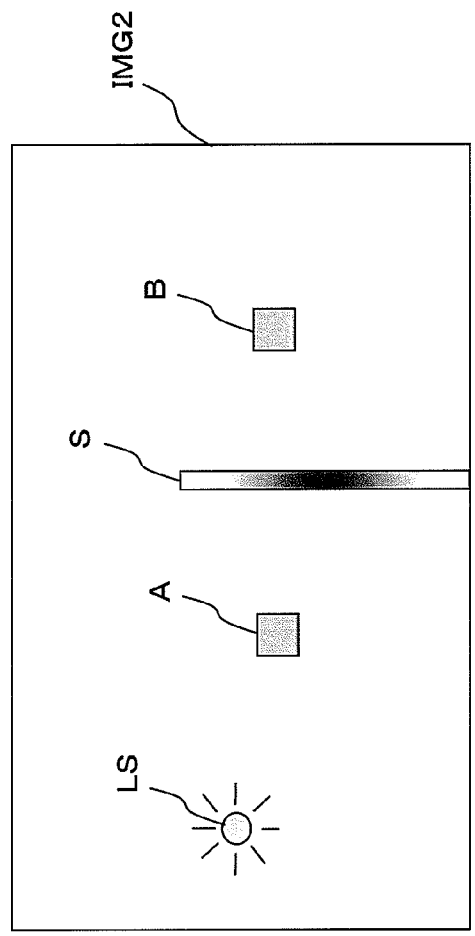
Fig. 11A
Fig. 11B

IMAGING APPARATUS AND METHOD THAT REDUCES ILLUMINATION VARIATIONS BY CONVERTING A LUMINANCE VALUE OF A TARGET PIXEL DEPENDING ON AN AVERAGE LUMINANCE VALUE OF PIXELS IN THE VICINITY OF THE TARGET PIXEL

BACKGROUND OF THE INVENTION

1. Field of the Invention

The present invention relates to an imaging apparatus, an imaging method, a program, a storage medium, and an integrated circuit for estimating distance information for each pixel of a captured image (the distance between a subject corresponding to the pixel and an image capturing position (camera installation position) in a three-dimensional space) using illumination.

2. Description of the Related Art

With the widespread of digital single-reflex cameras, many photographers enjoy expressing distance in their photographs. For such photographic expressions using distance, photographers may for example defocus and blur the background of an image by setting a faster shutter speed and a larger aperture to decrease the depth of field. However, compact digital cameras and video cameras have limitations in their lens sizes. With small lenses of compact digital cameras and video cameras, photographers cannot have satisfactory distance expressions in their photographs. If a technique for easily measuring distances is available, even compact digital cameras and video cameras will produce "desirable blur", which is comparable to blur produced by single-reflex cameras, by emulating blur that is produced by lenses based on the measured distances.

Therefore, the demands for cameras that can easily measure distances (distance information) are high. Moreover, the distance information has many other applications.

One technique known in the art for measuring distances is to estimate a distance using a plurality of cameras (stereo camera technique). An imaging apparatus that employs the stereo camera technique forms images of a subject using two cameras. The imaging apparatus calculates distances based on the principle of three-point measurements using differences (parallaxes) between subject points of the captured two images.

However, the imaging apparatus that employs the stereo camera technique is required to use a plurality of lenses. Moreover, such lenses are required to be arranged at sufficiently large intervals. It is unrealistic to apply the stereo camera technique to compact cameras.

Another technique known in the art for measuring distances is the time-of-flight (TOF) technique. An imaging apparatus that employs the TOF technique illuminates a subject with light, such as infrared light, and measures the time required by the light to travel back to the imaging apparatus. Based on the measured time, the imaging apparatus estimates the distance between the imaging apparatus and the subject corresponding to each pixel of the captured image (distance between the imaging apparatus and the subject in a three-dimensional space).

However, the imaging apparatus that employs the TOF technique is required to include special devices, such as an infrared light-emitting diode (LED) and a special charge-coupled device (CCD). The need for such special devices increases the size of the imaging apparatus. In the same manner as for the stereo camera technique, it is unrealistic to apply the TOF technique to compact cameras.

Another technique for measuring distances is to estimate the distance between a camera and a subject using a flash light illumination unit, which is the standard equipment of almost all cameras (imaging apparatuses) (see, for example, Patent Citation 1).

A conventional imaging apparatus (image processing apparatus) described in Patent Citation 1 estimates the distance between the imaging apparatus to the subject corresponding to each pixel of the captured image using the attenuation characteristic of the flash light over distance. The imaging apparatus obtains an image formed with the flash light (that attenuates in inverse proportion to the distance squared) based on a difference between the two images captured with and without the flash light. The apparatus divides the image formed with the flash light by an estimated value of the reflectance of each pixel of the subject in the captured image to calculate an estimated value of the subject distance. Among the pixels values of the image captured without flash light, each of which is used as the estimated value of the reflectance, pixel values 0 are replaced with pixel values 1 (to avoid division by zero).

Patent Citation 1: Japanese Unexamined Patent Publication No. 2001-352440

SUMMARY OF THE INVENTION

Technical Problem

However, the conventional imaging apparatus uses each pixel value of the image captured without flash light directly as the reflectance of the subject corresponding to each pixel, and fails to consider illumination variations (spatial illumination variations, which will be described in detail later) across the captured image. In other words, the conventional imaging apparatus fails to consider differences in actual illuminations of the subject in a three-dimensional space among different positions of the subject corresponding to pixels of the captured image. When the captured image has uniform illuminations across all spatial positions, each pixel value of the captured image (=illumination*reflectance) is proportional to the reflectance. However, the image usually has different illuminations at different spatial positions (the image has illumination variations). The pixel values of the image change accordingly. In other words, each pixel value of the image captured without flash light is not equal to the reflectance. The conventional imaging apparatus therefore estimates the reflectance of the subject with low precision, and accordingly estimates the subject distance with low precision.

A scene with illumination variations refers to a scene in which illumination differs depending on pixel positions (more specifically, positions of the subject in a three-dimensional space corresponding to pixel positions of the captured image) due to, for example, attenuation of illumination light over distance or shadows. For example, as shown in FIG. 11A, the imaging apparatus is assumed to capture an image IMG1, which is an image of a light sources LS, an object A, and an object B. Light from the light source LS attenuates over distance. The objects A and B are at the same distance from the imaging apparatus. In this scene, stronger light reaches the object A because the distance between the object A and the light source LS is shorter, whereas weaker light than the light illuminating the object A reaches the object B because the light from the light source LS attenuates more over the longer distance between the object B and the light source LS. The object A is assumed to have a luminance value Ya and the object B is assumed to have a luminance value Yb. In this case, Ya≧Yb. In this state, the scene has "illumination variations". As shown in FIG. 11B, the imaging apparatus is assumed to capture an image IMG2, which is an image of a light source LS, an object A, an obstacle S, and an object B. The objects A and B are at the same distance from the imaging apparatus. In this case, stronger light reaches the object A from the light source LS. In contrast, almost no light reaches the object B from the light source LS because the obstacle S blocks light from the light source from illuminating the object B (due to shadows of the obstacle S). The object B is assumed to have a luminance value Yb'. In this case, $Ya \geqq Yb \geqq Yb'$. In the captured image of this scene, the object B appears to be even darker. In this state, the scene also has "illumination variations".

It is normally unlikely that the captured image has uniform illuminations across all pixel positions. The captured image normally has illumination variations across different pixel positions. To estimate the reflectance with high precision, the imaging apparatus needs to eliminate such illumination variations (or in other words to make illuminations uniform).

It is an object of the present invention to provide an imaging apparatus, an imaging method, a program, a storage medium, and an integrated circuit for estimating the distance between a subject corresponding to each pixel of a captured image and the imaging apparatus in a three-dimensional space with high precision by estimating the reflectance of the subject with high precision. More specifically, based on the fact that image data will have values proportional to the reflectance when the image has uniform illuminations across all spatial positions, the imaging apparatus, the imaging method, the program, the storage medium, and the integrated circuit of the present invention eliminate illumination variations from a captured image and form an image that has uniform illuminations across all spatial positions by converting each pixel of the image using a different input and output characteristic depending on the vicinity average luminance of each pixel, and use pixel values of the image that has uniform illuminations across all spatial positions as the subject reflectance.

A first aspect of the present invention provides an imaging apparatus including an illumination unit, an imaging unit, an illumination light element obtaining unit, a reflectance estimation unit, and a distance information estimation unit. The illumination unit illuminates a subject with illumination light. The imaging unit captures a plurality of images each under a different condition of the illumination unit. The illumination light element obtaining unit obtains an image formed with an element of the illumination light (i.e. an image mainly formed with an illumination light) by eliminating a light element other than the illumination light element from the plurality of images captured by the imaging unit. The reflectance estimation unit eliminates illumination variations from one of the plurality of images captured by the imaging unit or from the image formed with the illumination light element, and estimates a reflectance of the subject corresponding to a pixel. The distance information estimation unit estimates a distance to the subject corresponding to the pixel based on the image formed with the illumination light element and the reflectance of the subject.

When the captured image has uniform illuminations across all spatial positions, each pixel value of the captured image (=illumination*reflectance) is proportional to the reflectance. However, the image usually has different illuminations at different spatial positions (the image has illumination variations). The pixel values of the image change accordingly. The imaging apparatus is therefore required to eliminate illumination variations (or in other words to make illuminations uniform). In this imaging apparatus, the reflectance estimation unit eliminates illumination variations from one of the plurality of images captured by the imaging unit or from the image formed with the illumination light element, and estimates the reflectance of the subject corresponding to each pixel. Therefore, the imaging apparatus estimates the reflectance of the subject with high precision. The imaging apparatus estimates the distance between the subject corresponding to each pixel and the imaging apparatus in a three-dimensional space based on the precisely estimated reflectance of the subject. Consequently, the imaging apparatus obtains distance information with high precision.

A second aspect of the present invention provides an imaging apparatus including an illumination unit, an imaging unit, an illumination light element obtaining unit, a reflectance estimation unit, and a distance information estimation unit. The illumination unit illuminates a subject with illumination light. The imaging unit switches an illumination state of the illumination unit within a predetermined time and obtains a first image signal in a state without the illumination light and a second image signal in a state with the illumination light. The illumination light element obtaining unit obtains an image signal of an image formed with an element of the illumination light by eliminating an element of the first image signal from the second image signal. The reflectance estimation unit eliminates illumination variations from one of the first image signal, the second image signal, and the image signal of the image formed with the illumination light element by converting a luminance value Ki of a target pixel using an input and output characteristic that differs depending on an average luminance value AKi of vicinity pixels of the target pixel, and estimates a reflectance of the subject corresponding to the target pixel and thereby obtains a reflectance indicative signal. The distance information estimation unit eliminates an element of the reflectance indicative signal from the image signal of the image formed with the illumination light element, and estimates distance information about a distance to the subject corresponding to the target pixel and thereby obtains a distance information indicative signal.

The value of a pixel is actually the product of the luminance and the reflectance of the pixel, and is inseparable (irreversible). However, illuminations change gradually across different spatial positions. The imaging apparatus therefore assumes the illuminations to substantially coincide with vicinity average luminance values, and performs conversion that causes the vicinity average luminance values to be uniform. In this manner, the imaging apparatus forms an image comparable to an image with uniform illuminations. When the image has uniform illuminations across all spatial positions, the image data will be proportional to the reflectance. In this manner, the imaging apparatus eliminates illumination variations from an input image and thereby separates and calculates the reflectance, which is actually inseparable.

The imaging apparatus estimates the distance between the subject corresponding to each pixel and the imaging apparatus in a three-dimensional space based on the precisely estimated reflectance of the subject. Consequently, the imaging apparatus obtains distance information with high precision.

The processing of "eliminating an element of the first image signal" performed by the illumination light element obtaining unit may specifically refer to subtracting the first image signal element from the second image signal. However, when the imaging unit obtains the first and second image signals with different exposure settings, the first and second image signals need to be corrected by gain adjustment in accordance with the exposure difference before the subtraction processing. The present invention covers this case as well.

The reflectance estimation unit may eliminate illumination variations from the second image signal and estimate the reflectance, or may eliminate illumination variations from a signal indicating a result of the subtraction processing and estimate the reflectance.

The "vicinity average luminance" refers to an average value of luminance of an area of, for example, about 400*240 pixels (for an image size of 1920*1080 pixels) that includes a processing target pixel at the center of the area. The area may be a rectangular area, a circular area, or an oval area. The luminance average value may be a simple average value or a weighted average value.

The processing "to eliminate an element of the reflectance indicative signal" performed by the distance information estimation unit may specifically refer to dividing the image signal of the image formed with the illumination light element by the reflectance indicative signal.

The "information about the distance to the subject corresponding to the pixel" herein refers to information about the distance between the imaging apparatus and the subject corresponding to the pixel in a three-dimensional space. The distance information may directly indicate the distance, or may indicate a physical value that is used to calculate the distance (for example, a value of the distance multiplied by a proportionality constant).

A third aspect of the present invention provides the imaging apparatus of the second aspect of the present invention in which the reflectance estimation unit converts the luminance value Ki to a luminance value in a predetermined range when the luminance value Ki and the average luminance value AKi are equal to each other.

The reflectance estimation unit converts a luminance value of a pixel included in an image portion without (or with less) luminance value changes to a luminance value within a predetermined range. This enables illumination variations to be eliminated efficiently.

A fourth aspect of the present invention provides the imaging apparatus of the third aspect of the present invention in which when the luminance value Ki and the average luminance value AKi are equal to each other, the reflectance estimation unit converts the luminance value Ki to a luminance value that is within a range of KoCent−Range*0.3 to KoCent+Range*0.3, where Range is a range of possible luminance values to which the luminance value Ki is converted, and KoCent is a center value of the range Range.

The reflectance estimation unit converts a luminance value of a pixel included in an image portion without (or with less) luminance value changes to a luminance value within a range of ±30% of the center value of the range of possible luminance values to which the luminance value is converted (±30% of the dynamic range of luminance values to which the luminance value is converted). This enables illumination variations to be eliminated efficiently.

A fifth aspect of the present invention provides the imaging apparatus of the second aspect of the present invention in which the reflectance estimation unit eliminates illumination variations by dividing the luminance value Ki by the vicinity average luminance value AKi and thereby obtains the reflectance indicative signal.

The reflectance estimation unit eliminates illumination variations efficiently with simple processing, and therefore obtains the reflectance indicative signal with high precision.

A sixth aspect of the present invention provides the imaging apparatus of one of the first to fifth aspects of the present invention in which the reflectance estimation unit obtains the reflectance indicative signal based on the image signal of the image formed with the illumination light element.

The imaging apparatus prevents the estimation precision from decreasing due to diffuse reflection at the object surface (described in detail later). The use of infrared light as the illumination light prevents the estimation precision from decreasing due to a difference in the reflectance in the visible light region and the reflectance in the infrared light region. The use of far-infrared light as the infrared light further prevents the estimation precision from decreasing due to infrared radiation caused by heat of the subject. As a result, the reflectance estimation unit obtains the reflectance indicative signal with high precision.

A seventh aspect of the present invention provides the imaging apparatus of one of the first to sixth aspects of the present invention in which flash light is used as the illumination light.

This imaging apparatus uses flash light as the illumination light. The imaging apparatus can use a flash illumination unit etc, which is the standard equipment of many imaging apparatus (cameras etc.). Therefore, the imaging apparatus is easily applicable to cameras that have small lenses, such as compact cameras and video cameras, which are equipped with a flash light illumination unit.

An eighth aspect of the present invention provides the imaging apparatus of one of the first to sixth aspects of the present invention in which infrared light is used as the illumination light.

The imaging apparatus uses the infrared light as the illumination light. In this case, the illumination light is invisible to the subject. With no flash light used in a scene, the subject is prevented from being annoyed by the illumination light. When distance information is estimated for a moving image, the repeated on and off of the flash light would annoy the subject. However, the infrared light does not annoy the subject when distance information is estimated for a moving image.

A ninth aspect of the present invention provides the imaging apparatus of one of the first to eighth aspects of the present invention further including an inverse-function processing unit. The inverse-function processing unit converts the distance information indicative signal obtained for the pixel to a signal indicating a distance to the subject corresponding to the pixel using an inverse function $B^{-1}(x)$ of a function $B(x)$, where the function $B(x)$ indicates an attenuation characteristic of the illumination light over distance, and x is the distance to the subject.

In this case, the imaging apparatus obtains the distance indicative image with high precision.

The illumination light normally attenuates over distance (attenuates in inverse proportion to the distance squared). The attenuation characteristic of the illumination light over distance can be obtained easily. When the attenuation characteristic of the illumination light over distance can be determined easily, a function $B(x)$ indicating the attenuation characteristic and an inverse function $B^{-1}(x)$ of the function $B(x)$ can also determined.

Thus, the imaging apparatus obtains distance information for each pixel using the inverse function $B^{-1}(x)$, and thereby obtains the distance information indicative signal with high precision.

A tenth aspect of the present invention provides the imaging apparatus of one of the first to eleventh aspects of the present invention further including a distance signal processing unit. The distance signal processing unit subjects the image signal to processing for enhancing a depth based on the distance information indicative signal.

This imaging apparatus performs the processing for enhancing a depth with high precision using the distance information indicative signal obtained with high precision.

A eleventh aspect of the present invention provides the imaging apparatus of one of the first to eleventh aspects of the present invention further including a distance signal processing unit. The distance signal processing unit subjects the image signal to processing for blurring a background based on the distance information indicative signal.

This imaging apparatus performs the processing for blurring a background with high precision using the distance information indicative signal obtained with high precision.

A twelfth aspect of the present invention provides the imaging apparatus of one of the first to eleventh aspects of the present invention further including a distance signal processing unit. The distance signal processing unit detects an image portion of the image to which the illumination light fails to reach sufficiently based on the distance information indicative signal, and performs processing for increasing a luminance value of the pixel included in the image portion.

A thirteenth aspect of the present invention provides a method used in an imaging apparatus including an illumination unit for illuminating a subject with illumination light, and an imaging unit for capturing a plurality of images each under a different condition of the illumination unit. The method includes an illumination light element obtaining process, a reflectance estimation process, and a distance information estimation process. In the illumination light element obtaining process, an image formed with an element of the illumination light is obtained by eliminating a light element other than the illumination light element from the plurality of images captured by the imaging unit. In the reflectance estimation process, illumination variations are eliminated from one of the plurality of images captured by the imaging unit or from the image formed with the illumination light element, and a reflectance of the subject corresponding to a pixel is estimated based on the image. In the distance information estimation process, a distance to the subject corresponding to the pixel is estimated based on the image formed with the illumination light element and the reflectance of the subject.

This imaging method is used in the imaging apparatus including the illumination unit that illuminates a subject with illumination light and the imaging unit that captures a plurality of images each under a different condition of the illumination unit. The imaging method has the same advantageous effects as the imaging apparatus of the first aspect of the present invention.

A fourteenth aspect of the present invention provides a program used in an imaging apparatus including an illumination unit for illuminating a subject with illumination light and an imaging unit for capturing a plurality of images each under a different condition of the illumination unit. The program enables a computer to function as an illumination light element obtaining unit, a reflectance estimation unit, and a distance information estimation unit. The illumination light element obtaining unit obtains an image formed with an element of the illumination light by eliminating a light element other than the illumination light element from the plurality of images captured by the imaging unit. The reflectance estimation unit eliminates illumination variations from one of the plurality of images captured by the imaging unit or from the image formed with the illumination light element, and estimates a reflectance of the subject corresponding to a pixel. The distance information estimation unit estimates a distance to the subject corresponding to the pixel based on the image formed with the illumination light element and the reflectance of the subject.

This program is used in the imaging apparatus including the illumination unit that illuminates a subject with illumination light and the imaging unit that captures a plurality of images each under a different condition of the illumination unit. The program has the same advantageous effects as the imaging apparatus of the first aspect of the present invention.

A fifteenth aspect of the present invention provides a computer readable storage medium storing a program used in an imaging apparatus including an illumination unit for illuminating a subject with illumination light and an imaging unit for capturing a plurality of images each under a different condition of the illumination unit. The program enables a computer to function as an illumination light element obtaining unit, a reflectance estimation unit, and a distance information estimation unit. The illumination light element obtaining unit obtains an image formed with an element of the illumination light by eliminating a light element other than the illumination light element from the plurality of images captured by the imaging unit. The reflectance estimation unit eliminates illumination variations from one of the plurality of images captured by the imaging unit or from the image formed with the illumination light element, and estimates a reflectance of the subject corresponding to a pixel. The distance information estimation unit estimates a distance to the subject corresponding to the pixel based on the image formed with the illumination light element and the reflectance of the subject.

The computer readable storage medium is used in the imaging apparatus including the illumination unit that illuminates a subject with illumination light and the imaging unit that captures a plurality of images each under a different condition of the illumination unit. The computer readable storage medium has the same advantageous effects as the imaging apparatus of the first aspect of the present invention.

An sixteenth aspect of the present invention provides an integrated circuit including an illumination unit, an imaging unit, an illumination light element obtaining unit, a reflectance estimation unit, and a distance information estimation unit. The illumination unit illuminates a subject with illumination light. The imaging unit captures a plurality of images each under a different condition of the illumination unit. The illumination light element obtaining unit obtains an image formed with an element of the illumination light by eliminating a light element other than the illumination light element from the plurality of images captured by the imaging unit. The reflectance estimation unit eliminates illumination variations from one of the plurality of images captured by the imaging unit or from the image formed with the illumination light element, and estimates a reflectance of the subject corresponding to a pixel. The distance information estimation unit estimates a distance to the subject corresponding to the pixel based on the image formed with the illumination light element and the reflectance of the subject.

The integrated circuit has the same advantageous effects as the imaging apparatus of the first aspect of the present invention.

A seventeenth aspect of the present invention provides an integrated circuit used in an imaging apparatus including an imaging unit for capturing a plurality of images each under a different condition. The integrated circuit includes an illumination unit, an illumination light element obtaining unit, a reflectance estimation unit, and a distance information estimation unit. The illumination unit illuminates a subject with illumination light. The illumination light element obtaining unit obtains an image formed with an element of the illumination light by eliminating a light element other than the illumination light element from the plurality of images captured by the imaging unit. The reflectance estimation unit eliminates illumination variations from one of the plurality of images captured by the imaging unit or from the image formed with the illumination light element, and estimates a reflectance of the subject corresponding to a pixel. The distance information estimation unit estimates a distance to the subject corresponding to the pixel based on the image formed with the illumination light element and the reflectance of the subject.

The integrated circuit is used in the imaging apparatus including the imaging unit that captures a plurality of images each under a different condition. The integrated circuit has the same advantageous effects as the imaging apparatus of the first aspect of the present invention.

Advantageous Effects

The present invention provides an imaging apparatus, an imaging method, a program, a storage medium, and an integrated circuit for estimating the distance between a subject corresponding to each pixel of an image and an imaging apparatus in a three-dimensional space with high precision by eliminating illumination variations and estimating the reflectance of the subject with high precision.

The present invention further enables the distance to be estimated with high precision using illumination light from a flash light illumination unit etc, which is the standard equipment of many imaging apparatuses (cameras). Therefore, the present invention is applicable to cameras that have small lenses, such as compact cameras and video cameras, and readily enables such cameras to perform image processing with high precision based on distances.

BRIEF DESCRIPTION OF THE DRAWINGS

FIGS. 7A and 7B are diagrams describing reflection light of outside light considering diffuse reflection and reflection light of flash light considering diffuse reflection;

FIG. 11 is a diagram describing images with illumination variations.

BEST MODE FOR CARRYING OUT THE INVENTION

Embodiments of the present invention will now be described with reference to the drawings.

First Embodiment 1.1 Structure of the Imaging Apparatus

An imaging apparatus 100 according to a first embodiment of the present invention will now be described.

Figure 1:
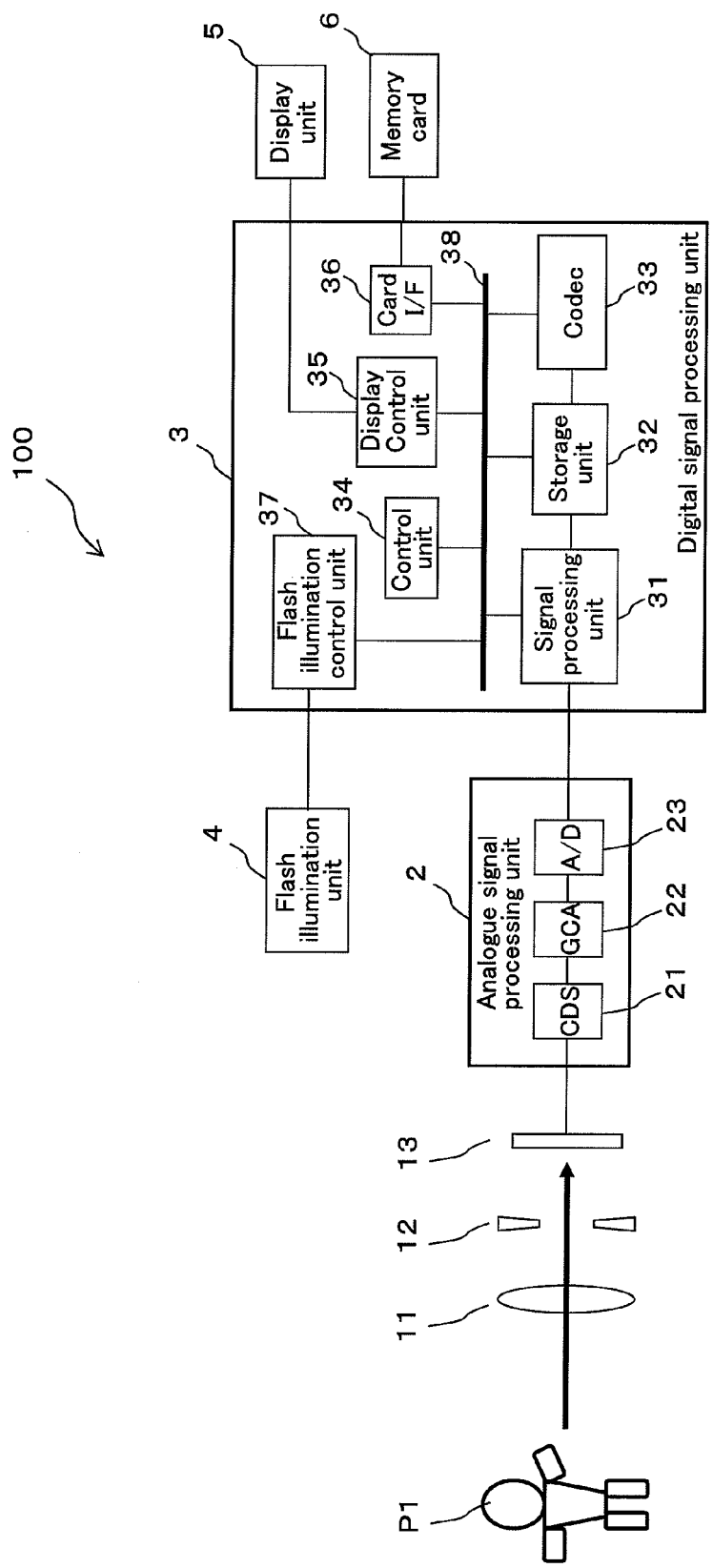
FIG. 1 is a schematic diagram showing the structure of an imaging apparatus 100 according to a first embodiment of the present invention.
Figure 2:
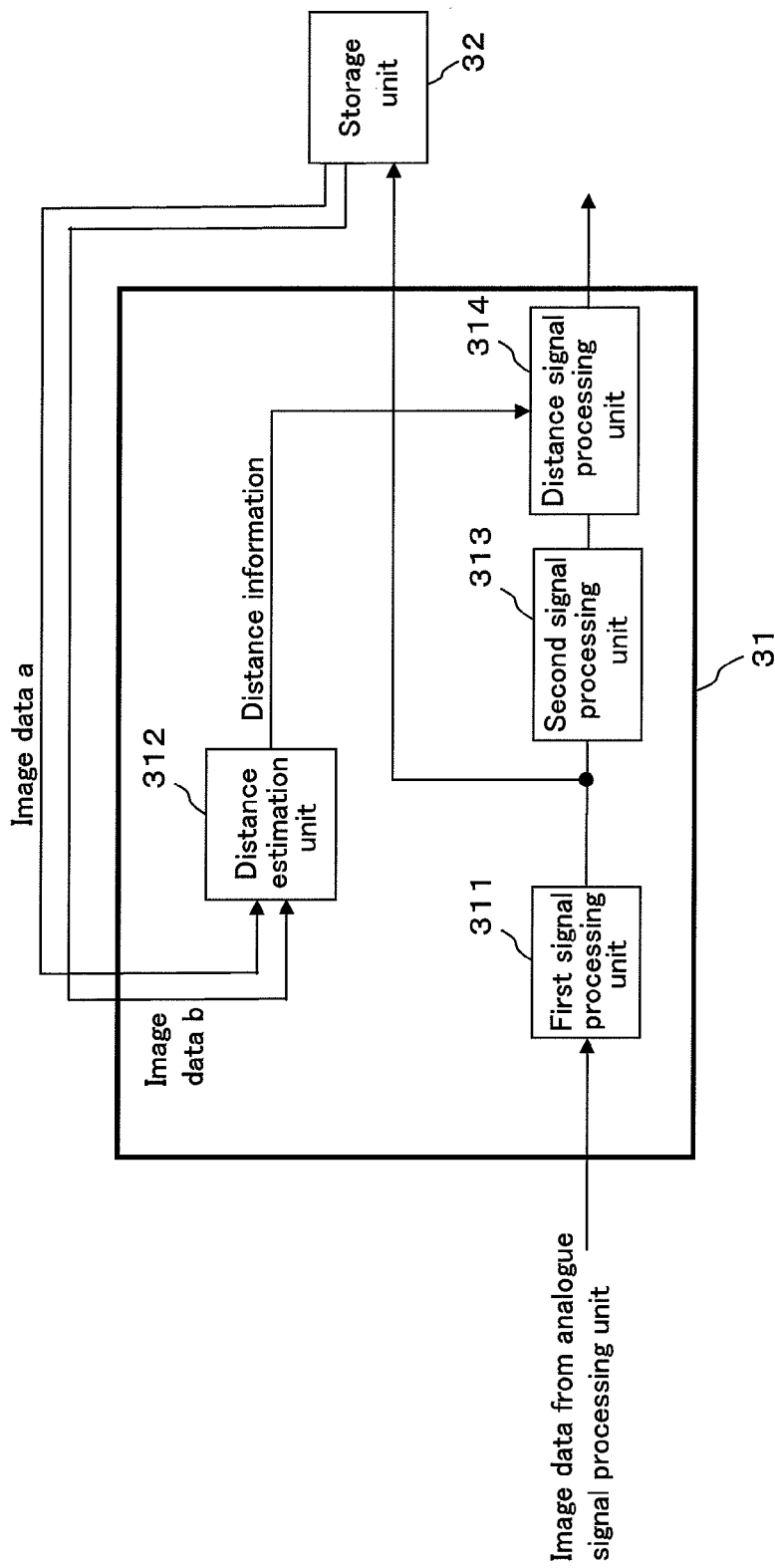
FIG. 2 is a schematic diagram showing the structure of a signal processing unit 31 and a storage unit 32 according to the first embodiment.
Figure 4:
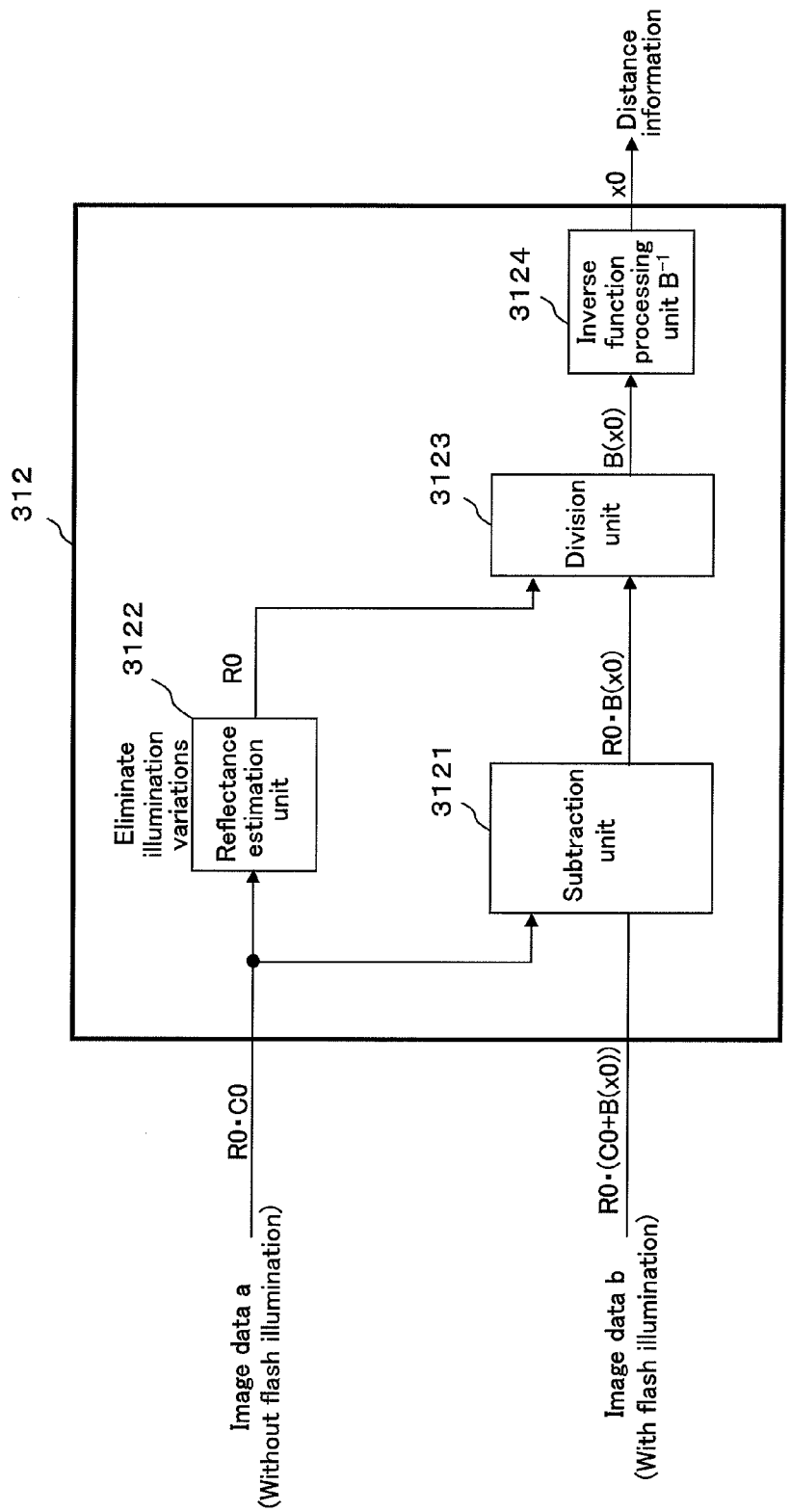
FIG. 4 is a schematic diagram showing the structure of a distance estimation unit 312 according to the first embodiment.

FIG. 1 is a schematic block diagram showing the structure of the imaging apparatus 100 (for example, a digital camera) according to the first embodiment. FIG. 2 is a schematic block diagram showing the structure of a signal processing unit 31 and a storage unit 32. FIG. 4 is a schematic block diagram showing the structure of a distance estimation unit 312.

As shown in FIG. 1, the imaging apparatus 100 includes an imaging lens 11, an aperture 12, an imaging unit (image sensor) 13, an analogue signal processing unit 2, a digital signal processing unit 3, and a flash illumination unit 4. The imaging lens 11 focuses light from a subject P1. The aperture 12 adjusts the amount of the light from the subject P1, which has been focused through the imaging lens 11. The imaging unit 13 converts the light from the subject P1 by photoelectric conversion to generate image signals (video signals). The analogue signal processing unit 2 subjects the image signals, which have been generated by the imaging unit 13, to analogue signal processing. The digital signal processing unit 3 subjects image signals resulting from the analogue signal processing to digital signal processing. The flash illumination unit 4 illuminates the subject P1 with flash light.

The imaging unit 13 receives light from the subject P1, which has been focused through the imaging lens 11 and passed through the aperture 12, and converts the light by photoelectric conversion to generate image signals (video signals). The imaging unit 13 outputs the generated image signals to the analogue signal processing unit 2. The imaging unit 13 is preferably formed by a CCD image sensor or a CMOS image sensor.

The analogue signal processing unit 2 receives the image signals output from the imaging unit 13. The analogue signal processing unit 2 subjects the image signals to analogue signal processing, and converts image signals resulting from the analogue signal processing to digital image signals, and outputs the digital image signals to the digital signal processing unit 3. The analogue signal processing unit 2 may be formed by, for example, an analogue circuit called a camera front end. The main components of the analogue signal processing unit 2 are a correlated double sampling (CDS) unit 21, a gain control amplifier (GCA) unit 22, and an analogue-to-digital (A/D) converter 23.

The digital signal processing unit 3 includes the signal processing unit 31, a storage unit 32, and a codec (coder/decoder) 33. The signal processing unit 31 subjects the image signals output from the analogue signal processing unit 2 to predetermined signal processing. The storage unit 32 stores an output from the signal processing unit 31. The codec 33 codes image signals stored in the storage unit 32 or also decodes image data (coded image data) stored in a storage medium, such as a memory card 6. The digital signal processing unit 3 further includes a control unit 34, a display control unit 35, a card I/F 36, a flash illumination control unit 37, and a bus 38. The control unit 34 controls the functional blocks of the digital signal processing unit 3. The display control unit 35 controls a display unit 5. The card I/F 36 functions as an interface via which data (signal) is input and output to and from the memory card 6. The flash illumination control unit 37 controls the flash illumination unit 4. The bus 38 connects the functional blocks of the digital signal processing unit 3 to one another. Although the functional blocks of the digital signal processing unit 3 are connected to one another by the bus 38 in FIG. 1, the functional blocks of the digital signal processing unit 3 may not be connected to one another by the bus but may be connected directly to one another to transmit data (signal) among the functional blocks as required.

As shown in FIG. 2, the signal processing unit 31 includes a first signal processing unit 311, a distance estimation unit 312, a second signal processing unit 313, and a distance signal processing unit 314.

The first signal processing unit 311 receives image signals output from the analogue signal processing unit 2. The first signal processing unit 311 subjects the image signals to signal processes, such as dynamic range compression and pixel interpolation, and outputs the processed signals to the second signal processing unit 313 and the storage unit 32.

The imaging unit (image sensor) 13 includes red (R), green (G), and blue (B) color filters formed separately corresponding to pixels. A signal generated based on each pixel of the imaging unit 13 contains information about only one of the R, G, and B colors. For a signal corresponding to each pixel that contains information about one color, pixel interpolation is performed using vicinity pixels (pixel values) to estimate (calculate) image signals containing information about the remaining two colors. As a result, an R element signal, a G element signal, and a B element signal are generated for each pixel of the imaging unit (image sensor) 13.

As shown in FIG. 4, the distance estimation unit 312 includes a subtraction unit 3121, a reflectance estimation unit 3122, a division unit 3123, and an inverse function processing unit 3124.

The distance estimation unit 312 receives an image signal of an image captured with flash light (referred to as an "image signal b" or "image data b") and an image signal of an image captured without flash light (referred to as an "image signal a" or "image data a"), which are output from the storage unit 32. The distance estimation unit 312 then estimates (calculates) distance information based on the image signal a and the image signal b, and outputs the estimated distance information to the distance signal processing unit 314.

The subtraction unit 3121 receives the image signal a and the image signal b, which are output from the storage unit 32. The value of each pixel corresponding to the image signal a is written as $R0*C0$, where $R0$ is the reflectance of the subject corresponding to the pixel, and $C0$ is the illuminance of the subject corresponding to the pixel. The value of each pixel corresponding to the image signal b is written as $R0*(C0+B(x0))$, where $x0$ is the distance from the imaging apparatus 100 to the subject corresponding to the pixel, using a function $B(x)$ that determines the distance-illuminance characteristic of the flash light, where x is information about the distance from the imaging apparatus to the subject. The subtraction unit 3121 then performs the processing of subtracting the image signal a from the image signal b. The subtraction processing is written as $$R0*(C0+B(x0))-R0*C0.$$

The subtraction unit 3121 then outputs the difference $R0*B(x0)$ to the division unit 3123.

The reflectance estimation unit 3122 receives the image signal a, which is output from the storage unit 32. The reflectance estimation unit 3122 eliminates illumination variations from the image signal a and estimates the reflectance of the subject (described in detail later). More specifically, the reflectance estimation unit 3122 calculates the reflectance $R0$ based on the pixel value $R0*C0$ of a pixel corresponding to the image signal a (processing target pixel), and outputs the calculated reflectance $R0$ to the division unit 3123.

The division unit 3123 receives the difference $R0*B(x0)$, which is output from the subtraction unit, and the reflectance $R0$, which is output from the reflectance estimation unit 3122. The division unit 3123 performs the division processing written as $$R0*B(x0)/R0.$$

Through the division processing, the division unit 3123 obtains the quotient $B(x0)$, and outputs the quotient $B(x0)$ to the inverse function processing unit 3124.

The inverse function processing unit 3124 receives the quotient $B(x0)$, which is output from the division unit 3123, and subjects the quotient $B(x0)$ to the processing written as $B^{-1}(x)$, which is an inverse function of the function $B(x)$ that determines the distance-illumination characteristic of the flash light. Through the processing, the inverse function processing unit 3124 obtains distance information $x0$ (distance information for the processing target pixel), and outputs the distance information $x0$ to the second signal processing unit 313. The function $B(x)$ indicating the distance-illumination characteristic of the flash light and its inverse function $B^{-1}(x)$ may be calculated in advance by measuring the characteristic of the flash light from the flash illumination unit 4. The function $B(x)$ may be prestored in, for example, a ROM (not shown) of the imaging apparatus 100.

The second signal processing unit 313 subjects the image signal output from the first signal processing unit 311 to signal processes, such as gamma correction, color correction, noise reduction, and enhancement, and outputs the processed signal to the distance signal processing unit 314.

Gamma correction is the process of correcting image data (image signal) using a gamma. The image signal is normally processed with a gamma of 1/2.2.

Color correction is the process of converting RGB values that are determined by the properties of the color filters included in the imaging unit (image sensor) 13, to RGB values defined in a standardized color space, such as a color space that complies with NTSC (National Television System Committee) or sRGB (standard RGB).

Noise reduction is the process of differentiating noise from amplitudes and frequencies of an image signal and reducing noise.

Enhancement is the process of increasing the resolution of an image by compensating for a decrease in the modulation transfer function (MTF), which may occur due to an adjustment amount of the aperture 12 of the imaging lens 11 (lens aperture).

The distance signal processing unit 314 receives the distance information output from the inverse function processing unit 3124 and the image signal output from the second signal processing unit 313, and processes the image signal output from the second signal processing unit 313 based on the distance information. When, for example, determining that the processing target pixel is included in a short-distance view portion of the captured image based on the distance information of the target pixel, the distance signal processing unit 314 processes the target pixel by, for example, enhancing the pixel value of the target pixel or enhancing the luminance contrast amount or the color contrast amount of the target pixel to increase the contrast between the target pixel and pixels that are in the vicinity of the target pixel. When, for example, determining that the processing target pixel is included in a long-distance view portion of the captured image based on the distance information of the target pixel, the distance signal processing unit 314 processes the target pixel by, for example, correcting the pixel value of the target pixel to blur the target pixel or decreasing the luminance contrast amount or the color contrast amount of the target pixel to lower the contrast between the target pixel and the pixels that are in the vicinity of the target pixel. Through the processing of the distance signal processing unit 314, the short-distance view portion of the image is enhanced and the long-distance view portion of the image is blurred. As a result, the imaging apparatus 100 forms an image with an increased depth or increased perspective (for example, an image corresponding to an image captured with a shallow depth of field). The distance signal processing unit 314 may output the processed image signal to the storage unit 32.

The signal processes performed by the first signal processing unit 311 and the second signal processing unit 313 are mere examples, and should not be limited to the processes described above.

The storage unit 32 stores an image signal output from the first signal processing unit 311 or outputs an image signal stored in the storage unit 32 to the distance estimation unit 312 based on a command from the control unit 34. The storage unit 32 may store an image signal that is coded by the codec 33. The storage unit 32 may store an image signal output from the distance signal processing unit 314. The storage unit 32 may further output its stored image signal etc. to the signal processing unit 31 or the display control unit 35 via the bus 38.

The codec 33 codes (according to, for example, JPEG) an image signal output from the storage unit 32, and outputs the coded image signal to a storage medium, such as the memory card 6, via the card I/F 36. Also, the codec 33 decodes (according to, for example, JPEG) the coded image signal output from the storage medium, such as the memory card 6, and outputs the decoded image signal to the signal processing unit 31, the storage unit 32, the display control unit 35, etc.

The control unit 34 controls the functional blocks of the digital signal processing unit 3. The control unit 34 is preferably formed by a microprocessor.

The display control unit 35 receives, for example, the image signal output from the signal processing unit 31, the image signal decoded by the codec 33, and the image signal output from the storage unit 32. The display control unit 35 writes the received image data to a memory, such as a VRAM (video RAM) (not shown). As a result, the display unit 5 displays the image data as a two-dimensional image on a display, such as a liquid crystal display (LCD).

The card I/F 36 functions as the interface via which data (signal) is input and output to and from the memory card 6. Via the card I/F 36, for example, the image signal output from the signal processing unit 31, the image signal coded by the codec 33, and the image signal stored in the storage unit 32 are output to and written to the memory card 6.

The flash illumination control unit 37 controls flush light illumination performed by the flash illumination unit 4 based on a command from the control unit 34. More specifically, the flash illumination control unit 37 controls the timings, period, and amount of the flash light illumination performed by the flash illumination unit 4.

Under control by the flash illumination control unit 37, the flash illumination unit 4 illuminates the subject with flash light.

The flash illumination unit 4 and the flash illumination control unit 37 correspond to an illumination unit. The imaging unit 13 corresponds to an imaging unit. The subtraction unit 3121 corresponds to an illumination light element obtaining unit. The reflectance estimation unit 3122 corresponds to a reflectance estimation unit. The division unit 3123 corresponds to a distance information estimation unit.

1.2 Operation of the Imaging Apparatus

The operation of the imaging apparatus 100 with the above structure will now be described.

Reflection light from the subject, whose image is to be captured, is focused onto the imaging unit (image sensor) 13 through the imaging lens 11, and is converted to image signals (video signals) by photoelectric conversion. The aperture 12 and a shutter (not shown), which are arranged on the optical path of the light, adjusts the amount of light that is focused onto the imaging unit (image sensor) 13. The focusing of the imaging lens 11 is controlled by moving the imaging lens 11 forward and backward (on the optical path) with the autofocusing or manual focusing function in a manner to optimize the amount of exposure light. Although the imaging lens 11 shown in FIG. 1 is formed by a single lens, the imaging lens 11 may actually be formed by a plurality of lenses. When the imaging lens 11 is a zoom lens, the imaging lens 11 is formed by more lenses.

The shutter, which is not shown in the figure, may be a mechanical shutter, or may be an electronic shutter that adjusts the amount of light by adjusting the driving timing of the imaging unit (image sensor) 13.

Although the present embodiment describes the case in which the imaging unit 13 is a CCD image sensor that includes separate R, G, and B color filters and its imaging surface consists of 2048 by 1536 pixels, the imaging unit 13 may be an image sensor that has another structure and whose imaging surface consists of a different number of pixels (for example, a CMOS image sensor). An image (optical image) is formed on the imaging unit 13, and is converted to analogue image signals. The analogue image signals are output from the imaging unit 13 to the analogue signal processing unit 2.

The image signals, which are output from the imaging unit 13, are processed by the analogue signal processing unit 2. More specifically, the CDS unit 21 reduces the sampling noise of the image signals. The GCA unit 22 adjusts the signal level of the image signals. The A/D converter 23 converts the image signals to digital image signals (image data). The digital image signals resulting from the A/D conversion performed by the A/D converter 23, which are pixel data (for example, 12-bit digital signals having tone levels ranging from 0 to 4095), are output to the signal processing unit 31 of the digital signal processing unit 3.

Figure 3:
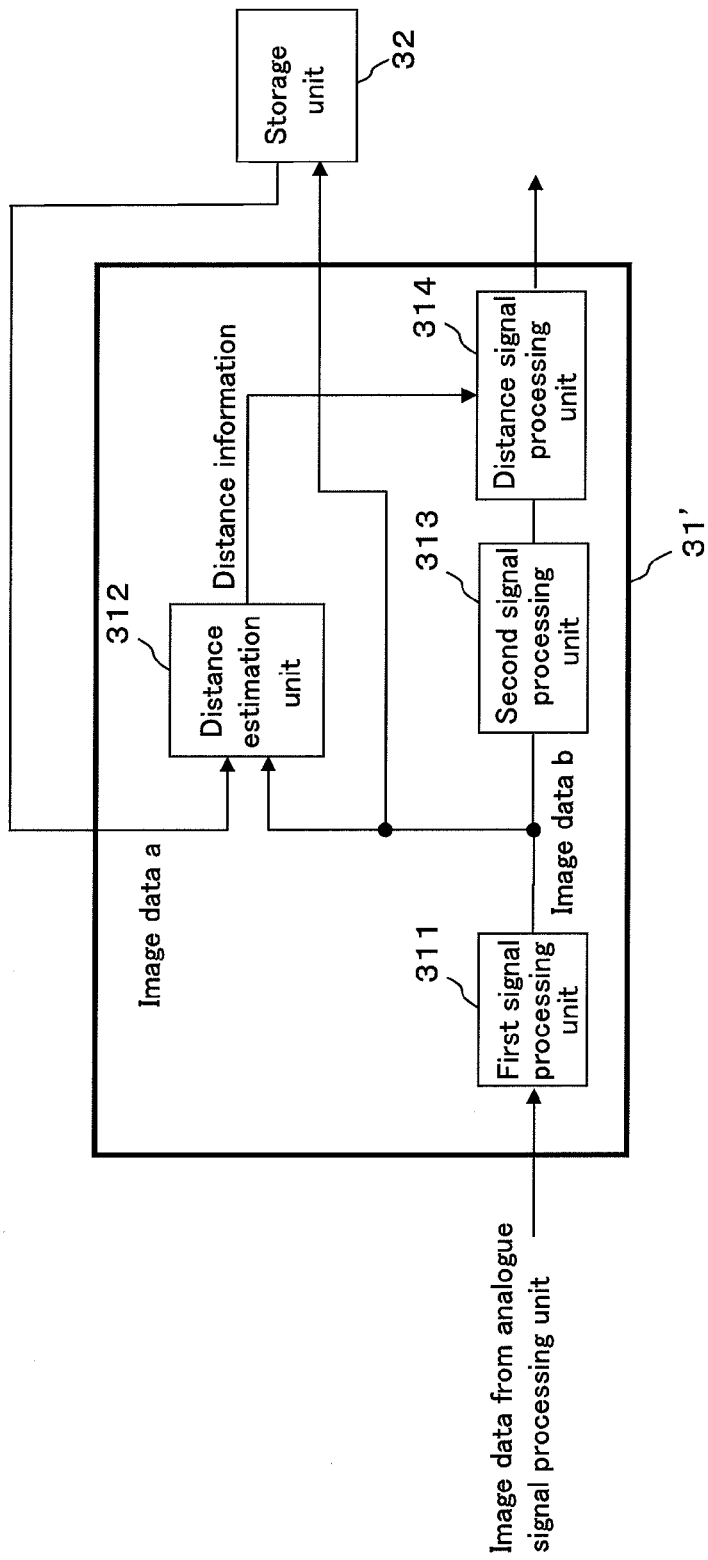
FIG. 3 is a schematic diagram showing the structure of a signal processing unit 31' and a storage unit 32 according to a modification of the first embodiment.

As shown in FIG. 3, the image signals (image data) output from the analogue signal processing unit 2 are input into the first signal processing unit 311 of the signal processing unit 31. The image signals input into the first signal processing unit 311 are then subjected to processes including dynamic range compression and pixel interpolation, and the processed signals are output to the second signal processing unit 313 and the storage unit 32.

The image signals (image data) output to the storage unit 32 are output to the distance estimation unit 312 based on a command from the control unit 34. The operation of the imaging apparatus 100 performed when image data b and image data a stored in the storage unit 32 are input into the distance estimation unit 312 will now be described. The image data b is image data of an image captured with flash light. The image data a is image data of an image captured without flash light. For ease of explanation, the processing is performed in units of pixels assuming that the processing target pixel is i0, the reflectance of the target pixel i0 of the image data a is R0, the illuminance is C0, the function for determining the distance-illuminance characteristic of the flash light is B(x) (x is the distance from the imaging apparatus 100 to the subject), and the distance information of the target pixel i0 is x0.

The image data a (=R0*C0), which is output from the storage unit 32, is input into the reflectance estimation unit 3122, and is subjected to, for example, visual processing (described in detail later) performed with the characteristics shown in FIG. 6. Through the visual processing, the reflectance estimation unit 3122 calculates the reflectance R0 without illumination variations. The reflectance estimation unit 3122 outputs the calculated reflectance R0 to the division unit 3123. The reflectance estimation unit 3122 may not use the visual processing, but may calculate the reflectance R0 without illumination variations by dividing the value of the target pixel i0 (=I(x, y)) by an average value Iavg (x, y) of pixels that are in the vicinity of the target pixel.

The image data b (=R0*(C0+B(x0))), which is output from the storage unit 32, is input into the subtraction unit 3121. The subtraction unit 3121 subtracts the image data a (=R0*C0) from the image data b to obtain a difference between the image data a and the image data b (image data of the image formed with the flash light (i.e. image data of the image mainly formed with the flash light)). The subtraction unit 3121 outputs the difference data (image data of the image formed with the flash light (i.e. image data of the image mainly formed with the flash light)) (=R0*B(x0)) to the division unit 3123. Preferably, the difference data is an image data of the image formed only with the flash light. During a period between the time when the image data a is obtained and the time when the image data b is obtained, if light components other than the flash light (the illumination light) change little, the image of difference between the image data a and the image data b is an image mainly formed with the flash light (the illumination light).

The division unit 3123 divides the difference data (image data of the image formed with the flash light), which is output from the subtraction unit 3121, by the reflectance R0, which is output from the reflectance estimation unit 3122, to obtain quotient data B(x0).

The quotient data B(x0), which is obtained by the division unit 3123, is input into the inverse function processing unit 3124. The inverse function processing unit 3124 subjects the quotient data B(x0) to the processing written as $B^{-1}(B(x0))$ to obtain distance information x0 of the target pixel i0. The inverse function processing unit 3124 outputs the distance information x0 to the distance signal processing unit 314.

The image signal output from the first signal processing unit 311 is input into the second signal processing unit. The second signal processing unit subjects the signal to processes such as gamma correction, color correction, noise reduction, and enhancement, and outputs the processed signal to the distance signal processing unit 314.

The distance signal processing unit 314 subjects the image signal (image data) (target pixel i0), which is output from the second signal processing unit 313, to processes performed based on distances, such as depth enhancement, based on the distance information x0 output from the distance estimation unit 312.

The image data (image signal) processed by the signal processing unit 31 is then written to the storage unit 32. The image data is then, for example, coded by the codec 33 or for example compressed according to JPEG. Header information is attached to the image data by the control unit 34. The image data is written as an Exif (Exchangeable image file) to a storage medium, such as the memory card 6, via the card I/F 25. The data written to the storage unit 32 may be data (image signal) coded by the codec 33. The storage medium to which the image data (image signal) is written as an Exif should not be limited to the medium described above. For example, the image data may be written to a hard disc drive (HDD) incorporated in the imaging apparatus.

The image data written to the memory card 6 is displayed on the display unit 5, such as an LCD, under control by the display control unit 35.

Distance Estimation Process

A distance estimation process performed by the imaging apparatus 100 will now be described with reference to FIGS. 5 to 6.

Figure 5:
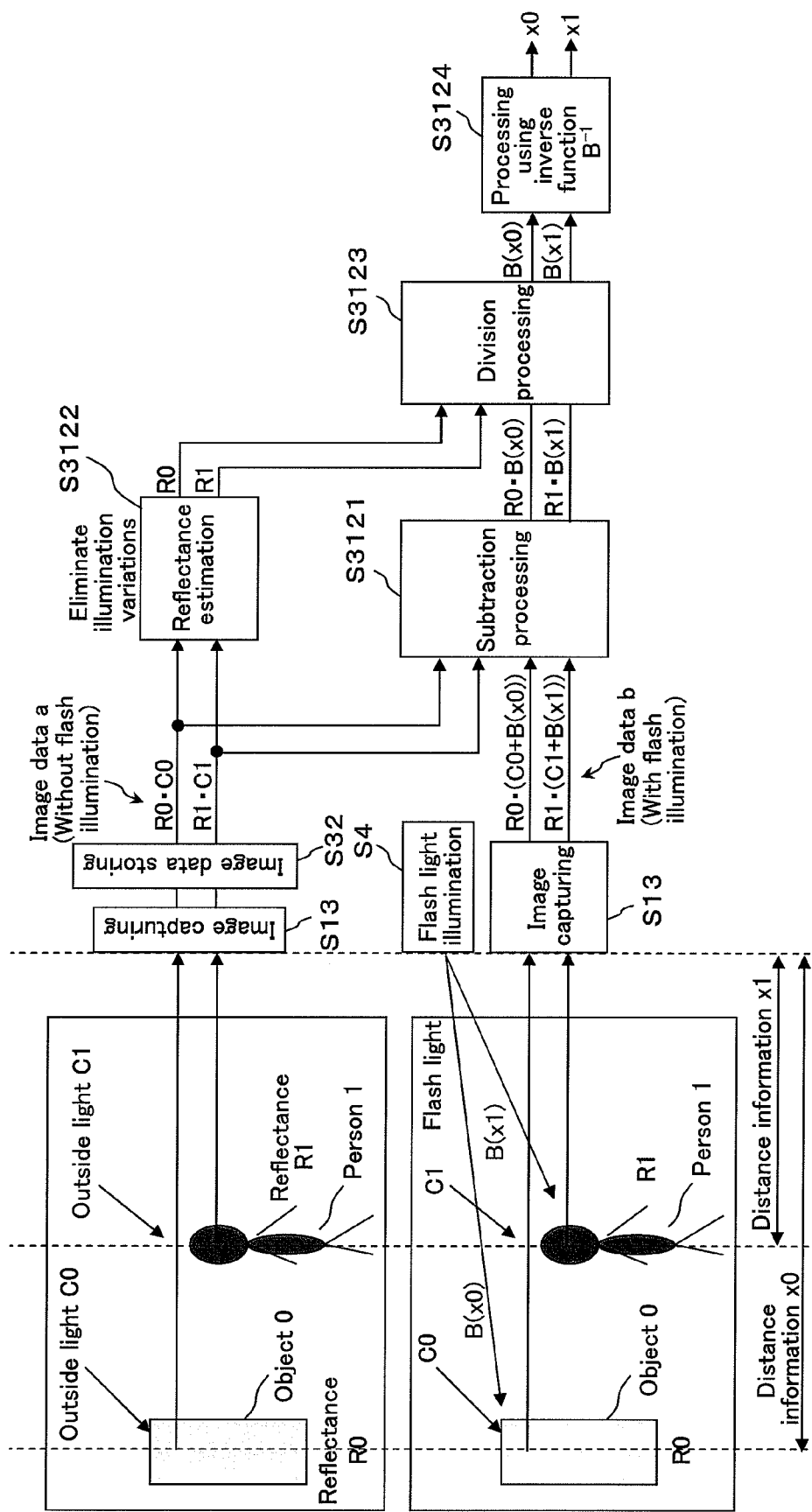
FIG. 5 is a diagram illustrating a distance estimation process performed by the imaging apparatus 100 of the first embodiment.

FIG. 5 is a diagram illustrating the distance estimation process performed by the imaging apparatus 100.

The distance estimation process performed by the imaging apparatus 100 includes the five steps described below.

(1) Two images (image data) are captured respectively with and without flash light.

(2) Image data of an image formed with the flash light is obtained based on a difference between the two images.

(3) Illumination variations are eliminated from the image data of the image captured without flash light (image data a) and the reflectance of the subject is estimated.

The reflectance of the subject may be estimated using image data of an image captured with flash light or image data of an image formed with flash light (difference image) (illumination variations may be eliminated from the data). The estimation precision increases further when the reflectance of the subject is estimated using the image data of the image formed with flash light (difference image) (described in detail later).

(4) The image data of the image formed with the flash light is divided by the estimated reflectance of the subject to calculate the distance of the subject (distance from the imaging apparatus 100 to the subject in a three-dimensional space).

(5) The image processing is performed based on the subject distance.

The five steps will be described in detail. The method for calculating the subject distance will also be described using an object 0 and a person 1 shown in FIG. 5. The object 0 is assumed to have an illumination C0, a reflectance R0, and a distance x0 from the camera. The person 1 is assumed to have an illumination C1, a reflectance R1, and a distance x1 from the camera.

The illumination of the flash light attenuates over distance. The attenuation characteristic of the flash light illumination is expressed using the function B(x) of the distance x from the flash light illumination unit (this distance is assumed to be equal to the distance from the imaging apparatus 100).

In the present embodiment, the processing is performed based on luminance values of the image. However, the processing my be performed based on colors, such as RGB colors, using spectral sensitivity characteristics of the image.

Step 1: Two Images are Captured Respectively with and without Flash Light

The imaging apparatus 100 first captures an image without flash light.

An image signal C0*R0 corresponding to the object 0 and an image signal C1*R1 corresponding to the person 1 are obtained by capturing an image without flash light.

The imaging apparatus 100 next captures an image with flash light. It is preferable to capture the images with and without the flash light consecutively.

To set the same depth of filed, the imaging apparatus 100 preferably uses the same aperture value as the aperture value used when capturing the image without flash light.

A large amount of reflection light from the subject generated by the flash light may be input into the imaging unit (image sensor) 13, and may cause an output image signal of the imaging unit 13 to be saturated. To prevent signal saturation, the flash illumination control unit 37 preferably adjusts the intensity of the flash light in a manner that an appropriate amount of flash light is emitted from the flash illumination unit 4.

Instead of adjusting the intensity of the flash light, the shutter speed of the imaging apparatus 100 may be set larger. In this case, the two images captured with and without the flash light need to be corrected by gain multiplication in accordance with the change in the shutter speed before the subtraction processing performed in step 2. When the shutter speed is changed, the imaging apparatus 100 needs additional calculation formulas, but such calculation formulas will not be described.

An image signal (C0+B(x0))*R0 corresponding to the object 0 and an image signal (C1+B(x1))*R1 corresponding to the person 1 are obtained by capturing an image with flash light.

In step 1, the two captured images are assumed to be stored in the storage unit 32. Alternatively, the two images may be stored in a storage medium, such as the memory card 6. In this case, the processing in steps 2 to 5 may be performed when the images are reproduced.

Step 2: Image Data of an Image Formed with the Flash Light is Obtained Based on a Difference Between the Two Images The image data a, which is image data of the image captured without flash light, is subtracted from the image data b, which is image data of the image captured with flash light. As a result, image data of an image formed with the flash light is obtained.

An image signal (image data) B(x0)*R0 corresponding to the object 0 and an image signal B(x1)*R1 corresponding to the person 1 are obtained by obtaining the image formed with flash light.

To prevent the subject image from shifting due to movement of the imaging apparatus or movement of the subject, the two images captured by the imaging apparatus 100 may be subjected to alignment before the subtraction processing described above.

Step 3: Illumination Variations are Eliminated from the Image Data obtained without Flash Light and the Reflectance of the Subject is Estimated Two methods for eliminating illumination variations from the image data a obtained by capturing the image without flash light and estimating the reflectance of the subject will now be described.

Step 3.1: First Method

The first method is based on a method used by a visual processing apparatus described in Japanese Unexamined Patent Publication No. 2006-024176.

The visual processing apparatus converts the input luminance of each pixel using different input and output characteristics depending on the vicinity average luminance of each pixel, and outputs the resulting luminance as an output luminance. The visual processing apparatus uses various input and output conversion characteristics to perform tone mapping conversion (tone level conversion) maintaining the local contrast (such as dynamic range compression and dark image correction), local contrast enhancement, etc.

The vicinity average luminance refers to an average value of luminance of an area of, for example, about 400*240 pixels (for an image size of 1920*1080 pixels) that includes a processing target pixel at the center of the area. The area may be a rectangular area, a circular area, or an oval area. The luminance average value may be a simple average value or a weighted average value.

Figure 6:
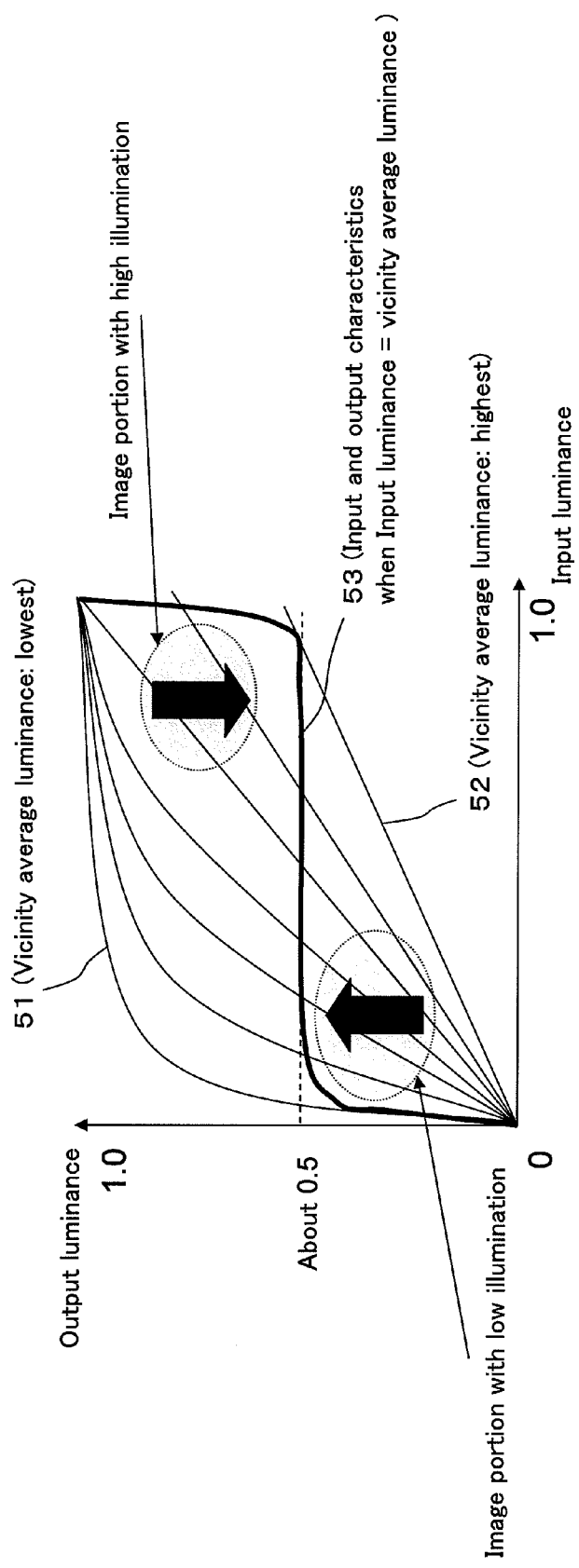
FIG. 6 shows input and output characteristics used in an illumination variation eliminating process performed by the imaging apparatus 100 of the first embodiment.

The first method is to eliminate illumination variations based on the input and output characteristics shown in FIG. 6. The reflectance estimation unit 3122 of the imaging apparatus 100 uses the first method.

The value of a pixel is actually the product of the luminance and the reflectance of the pixel, and is inseparable (irreversible). However, illuminations change gradually across different spatial positions. The imaging apparatus 100 therefore assumes the illuminations to substantially coincide with the vicinity average luminance values, and performs conversion that causes the vicinity average luminance values to be uniform. In this manner, the imaging apparatus 100 forms an image comparable to an image with uniform illuminations. When the image has uniform illuminations across all spatial positions, the image data will be proportional to the reflectance. In this manner, the imaging apparatus 100 eliminates illumination variations from an input image and thereby separates and calculates the reflectance, which is actually inseparable.

FIG. 6 shows the input and output characteristics used in the processing for eliminating illumination variations in the present embodiment.

The input and output characteristics are represented by a plurality of tone mapping conversion curves that are selectively used depending on the vicinity average luminance. A curve 51 represents a conversion curve used when the vicinity average luminance is the lowest. A curve 52 represents a conversion curve used when the vicinity average luminance is the highest. Curves between the curves 51 and 52 represent conversion curves selected in a manner that conversion curves closer to the curve 51 are selected as the vicinity average luminance is lower and conversion curves closer to the curve 52 are selected as the vicinity average luminance is higher.

The input and output characteristics may be realized using a circuit. To reduce the circuit scale, the input and output characteristics may be realized using a two-dimensional lookup table that receives an input luminance of a target pixel and an average luminance of pixels that are in the vicinity of the target pixel.

A thick line 53 is a curve plotted on output luminance points at which the input luminance of the target pixel coincides with the vicinity average luminance of each conversion curve. The line 53 indicates how luminance values of an image portion with a large area having no changes in its tone levels (no changes in its luminance values) are converted.

According to the characteristics shown in FIG. 6, the luminance values on the thick line are converted constantly to fixed luminance values. Thus, an image portion with a low illumination (with a low vicinity average luminance) is converted to an image portion with a higher luminance. An image portion with a high illumination (with a high vicinity average luminance) is converted to an image portion with a lower luminance. The input luminance is converted in a manner that the vicinity average luminance of each portion of the image will be constantly fixed.

As a result, an image with uniform illuminations across all spatial positions (an image from which illumination variations are eliminated) is formed.

Although the input luminance value is converted to a fixed luminance value with the method described above, the input luminance value may be converted to luminance values in a variable range, or in other words may be converted to luminance values in a predetermined range. In this case, the predetermined range is preferably within ±30% of the center value of the range of possible luminance values to which the input luminance value can be converted (±30% of the dynamic range of luminance values to which the luminance value is converted).

The image signal C0*R0 corresponding to the object 0 and the image signal C1*R1 corresponding to the person 1 are converted to image signals comparable to signals obtained under uniform illuminations. As a result, the image signals are converted to the image signal C*R0 for the object 0 and the image signal C*R1 for the person 1, where C is the illumination. For ease of explanation, the image signals are simply referred to as the signal R0 for the object 0 and the signal R1 for the person 1.

Step 3.2: Second Method

The second method is based on a method for improving a digital image described in International Publication No. WO 97/45809 (Published Japanese translation No. 2000-511315).

The above publication describes the method for improving a digital image in a manner that the image appears similar to what is perceived by human vision in all kinds and levels of illumination across the entire scene. More specifically, the observed intensity value I (x, y) is reasonably complete as I(x, y)=DS(x, y)*DR(x, y), where DS(x, y) is the spatial distribution of the source illumination and DR(x, y) is the distribution of the scene reflectances. The associated retinex output R (x, y) is written as $$R(x, y) = \log\{DS(x, y) * DR(x, y) / DSavg(x, y) * DRavg(x, y)\} \quad (1)$$

where the subscript "avg" is the spatially weighted average value of each term. As long as DS=DSavg, the contributions of spatial illumination cancel. Even when this is not strictly true, the reflectance function log(DS/DSavg) should dominate illumination changes. The above considerations hold true for each spectral band of an image.

The second method is based on the method for improving the digital image.

When the image signal I(x, y) (corresponding to a target pixel i0) is divided by an average value Iavg(x, y) of values of pixels that are in the vicinity of the target pixel, the output image signal Iout(x, y) is written as $$Iout(x, y) = I(x, y)/Iavg(x, y)$$
$$= DS(x, y) * DR(x, y)/DSavg(x, y) * DRavg(x, y).$$

Spatial illumination changes normally occur gradually. Thus, DS ≈ DSavg. Therefore, Iout(x, y) ≈ DR(x, y)/DRavg(x, y).

This is the same as (approximate to) formula 1 when DS=DSavg. In this case, the reflectance of the subject is calculated without spectral illumination contributions, that is, without illumination variations.

The reflectance estimation unit 3122 divides the image signal I (x, y) by the average value Iavg (x, y) of the vicinity pixels to obtain the reflectance R0 without illumination variations.

With the second method, the image signal C0*R0 corresponding to the object 0 and the image signal C1*R1 corresponding to the person 1 are converted to image signals comparable to signals obtained under uniform illuminations. As a result, the image signals are converted to the image signal C*R0 for the object 0 and the image signal C*R1 for the person 1, where C is the illumination. For ease of explanation, the image signals are simply referred to as the signal R0 for the object 0 and the signal R1 for the person 1 in the same manner as with the first method.

With the second method, the image signal C0*R0 corresponding to the object 0 is converted to the reflectance R0, and the image signal C1*R1 corresponding to the person 1 is converted to the reflectance R1.

Although the average pixel value of the vicinity portion is calculated with the second method, the present inventions should not be limited to this method. Alternatively, a representative value of an image portion with similar illumination effects, such as a weighted average value or a center value of the image portion, may be calculated.

In the above example, the value of the target pixel is divided by the average value of the vicinity pixels. However, the present invention should not be limited to this method. Any value obtained by comparing the luminance value at the (x, y) position with the representative value described above may be used as the reflectance at the (x, y) position.

The reflectance may be calculated with methods other than the above methods For example, the obtained image data may not be directly used as the reflectance. Instead, the reflectance may be calculated for each coordinate position based on the image data according to an image portion with similar effects of illumination variations.

For example, a dark portion (first portion) of an image, which is dark due to, for example, an obstacle, and a bright portion (second portion) of the image are extracted from image data. The calculation formula and the calculation range for calculating the reflectance at the (x, y) position may be changed depending on whether the (x, y) position belongs to the dark portion or the bright portion.

(Step 4: The Image Data of the Image Formed with the Flash Light is Divided by the Estimated Reflectance of the Subject to Calculate the Subject Distance)

The image data of the image formed with the flash light is divided by the subject reflectance of each pixel. To prevent the data from being divided by 0, the subject reflectance is clipped using a small positive value.

As a result, the image signal B(x0)*R0 corresponding to the object 0 in the image data of the image formed with the flash light is divided by the subject reflectance R0. The image signal B(x1)*R1 corresponding to the person 1 in the image data of the image formed with the flash light is divided by the subject reflectance R1. As a result, quotient data B(x0) corresponding to the object 0 and quotient data B(x1) corresponding to the person 1 are obtained.

Further, the quotient data B(x0) corresponding to the object 0 and the quotient data B(x1) corresponding to the person 1 are subjected to the processing using the inverse function of the function B. More specifically, the quotient data B(x0) is subjected to the processing written as $$B^{-1}(B(x0))=x0.$$

The quotient data B(x1) is subjected to the processing written as $$B^{-1}(B(x1))=x1.$$

As a result, the subject distance (subject distance information) x0 corresponding to the object 0 and the subject distance x1 corresponding to the person 1 are calculated. The inverse function of the function B is obtained through experiment based on the characteristics of the flash light from the flash illumination unit 4.

The values B(x0) and B(x1) are smaller as the distance (distance between the subject and the imaging apparatus 100)

is greater. The imaging apparatus 100 may use these values to perform the image processing in step 5 and subsequent steps.

[When the Subject Reflectance is Estimated Based on Image Data of the Image Formed with Flash Light (Difference Image) in Step 3 and the Distance is Calculated by Subtraction Processing in Step 4]

As described above, the subject reflectance is estimated with improved precision based on the image data of the image formed with flash light (difference image). This will now be described in detail.

Reflections include specular reflection and diffuse reflection. Surfaces of most objects are rough, and therefore contain many diffuse reflection elements. To estimate distances with high precision, the distance estimation needs to consider such diffuse reflection.

Diffuse reflection occurs with the same intensity in each direction. The diffuse reflection intensity is expressed as the inner product of the incident light vector C (The magnitude of vector C is C) and the normal vector n (unit vector) of the reflection surface multiplied by the reflectance R of the reflection surface. More specifically, the diffuse reflection intensity is written as $(C \cdot n)*R = C*R*\cos\phi$ (Lambert's cosine law), where $\phi$ is an angle formed by the incident light vector and the normal vector of the reflection surface.

This indicates that the reflection light attenuates by an amount corresponding to $\cos\phi$. Without considering the effect of such diffuse reflection, the distance would be estimated with lower precision.

The distance precision decreases when the subject reflectance is estimated based on the image data a or the image data b. The distance precision does not decrease when the subject reflectance is estimated based on the image data of the image formed with flash light. The reasons for such phenomena will now be described with reference to FIGS. 7A and 7B and FIG. 8.

FIGS. 7A and 7B are diagrams describing reflection light of outside light considering diffusion reflection and reflection light of flash light considering diffusion reflection.

FIG. 7A shows the case in which the incident angle of the outside light (angle formed by the illumination direction of the outside light and the normal to the subject reflection surface) is 0 degree or more. An image signal formed with the reflection light of the outside light (diffuse reflection light) is written as $C0*R0*\cos(\phi0)$ for the object 0, where $\phi0$ is the angle of the outside light incident on the object 0.

An image signal formed with the reflection light of the outside light (diffuse reflection light) is written as $C1*R1*\cos(\phi1)$ for the person 1, where $\phi1$ is the angle of the outside light incident on the person 1.

FIG. 7B shows the case in which the incident angle of the flash light (angle formed by the illumination direction of the flash light and the normal to the subject reflection surface) is 0 degree or more. An image signal formed with the reflection light of the flash light is written as $B(x0)*R0*\cos(\theta0)$ for the object 0, where $\theta0$ is the angle of the flash light incident on the object 0.

An image signal formed with the reflection light of the flash light is written as $B(x1)*R1*\cos(\theta1)$ for the person 1, where $\theta1$ is the angle of the flash light incident on the person 1.

Figure 8:
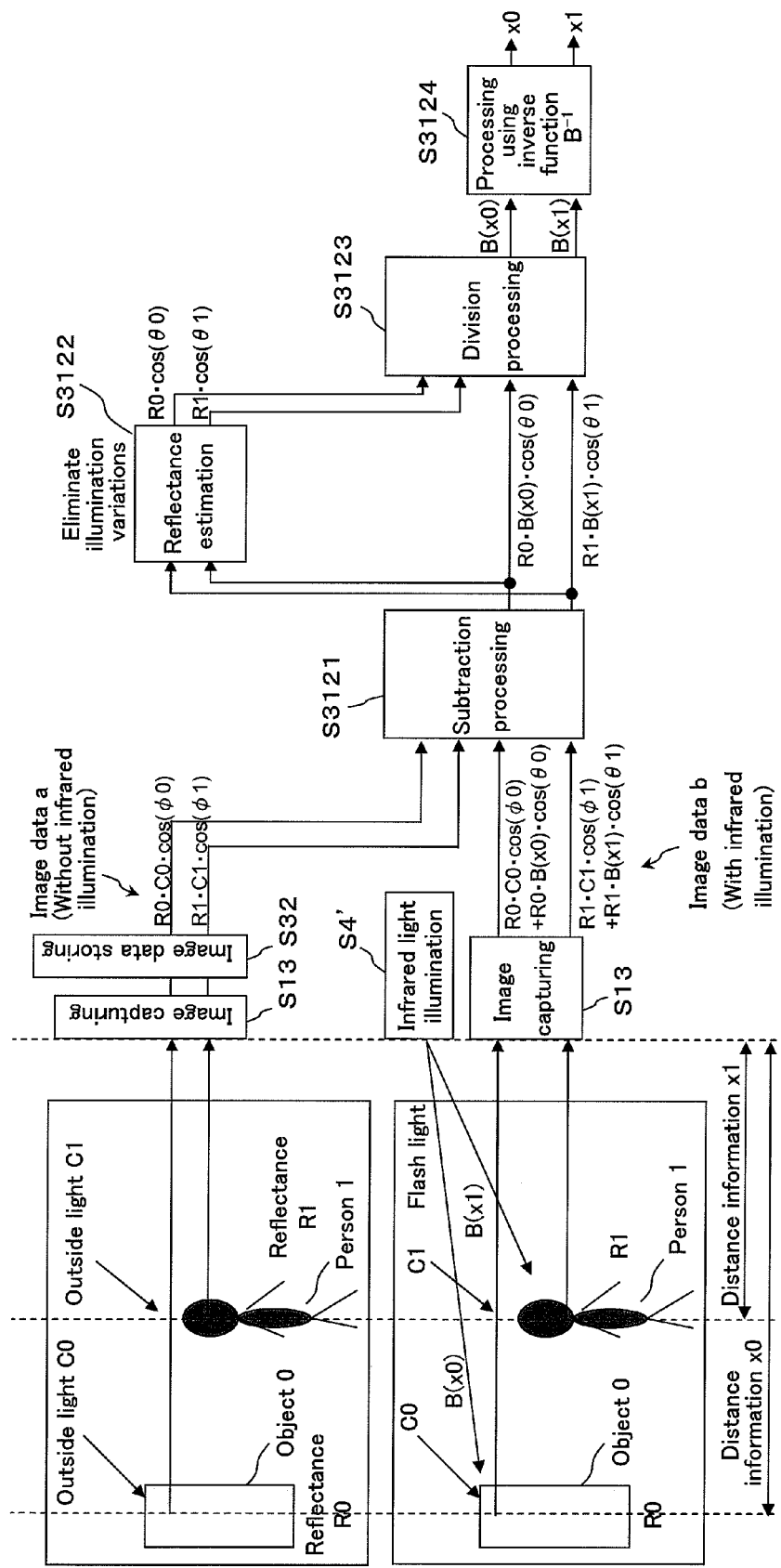
FIG. 8 schematically shows the operation of the imaging apparatus 100 of the first embodiment when the imaging apparatus 100 performs the distance estimation process considering diffuse reflection.

As shown in FIG. 8, therefore, image signals of the image data a are written as $C0*R0*\cos(\phi0)$ for the object 0, and
$C1*R1*\cos(\phi1)$ for the person 1.

Image signals of the image data b are written as
$C0*R0*\cos(\phi0)+B(x0)*R0*\cos(\theta0)$ for the object 0, and
$C1*R1*\cos(\phi1)+B(x1)*R1*\cos(\theta1)$ for the person 1.

Image signals of the image data of the image formed with flash light (=image data b−image data a) are written as
$B(x0)*R0*\cos(\theta0)$ for the object 0, and
$B(x1)*R1*\cos(\theta1)$ for the person 1.

The reasons why the distance precision decreases when the distance is calculated based on the image data a or the image data b will now be described.

When illumination variations are eliminated from the image data a (described in detail later), the terms of the illuminations C0 and C1 cancel out. In this case, the estimated reflectance is written as
$R0*\cos(\phi0)$ for the object 0, and
$R1*\cos(\phi1)$ for the person 1.

Thus, the distance information obtained through the division processing is written as
$B(x0)*\cos(\theta0)/\cos(\phi0)$ for the object 0, and
$B(x1)*\cos(\theta1)/\cos(\phi1)$ for the person 1.

In this case, the difference between the incident angle of the outside light and the incident angle of the flash light would decrease the distance precision.

When illumination variations are eliminated from the image data b, the terms of the illuminations C0, C1, B(x0), and B(x1) cancel out. The estimated reflectance is written as
$R0(\cos(\phi0)+\cos(\theta0))$ for the object 0, and
$R1(\cos(\phi1)+\cos(\theta1))$ for the person 1.

In this case, the distance information obtained through the division processing is written as
$B(x0)*\cos(\theta0)/(\cos(\phi0)+\cos(\theta0))$ for the object 0, and
$B(x1)*\cos(\theta1)/(\cos(\phi1)+\cos(\theta1))$ for the person 1.

In the same manner, the difference between the incident angle of the outside light and the incident angle of the flash light would decrease the distance precision.

In contrast, when illumination variations are eliminated from the image data of the image formed with flash light, the terms of the illuminations B(x0) and B(x1) cancel out. In this case, the estimated reflectance is written as
$R0(\cos(\theta0))$ for the object 0, and
$R1(\cos(\theta1))$ for the person 1.

The distance information obtained through the division processing is written as
$B(x0)$ for the object 0, and
$B(x1)$ for the person 1.

The incident angle of the outside light and the incident angle of the flash light have no difference between them. In this case, the distance precision does not decrease.

As described above, when the subject reflectance is obtained based on the image data of the image formed with flash light, the subject distance is estimated without being affected by a difference between the incident angle of the outside light and the incident angle of the flash light. Therefore, the imaging apparatus 100 estimates the subject distance with higher precision.

[When the Subject Reflectance is Estimated Based on Image Data of the Image Formed with Infrared Light (Difference Image) in Step 3 and the Distance is Calculated by Division Processing in Step 4]

When infrared light is used as the illumination light, it is also preferable to estimate the reflectance based on image data of an image formed with the infrared light (i.e. an image mainly formed with the infrared light) in the same manner as described above.

In particular, the infrared light, which is not visible, is not perceivable to humans when the infrared light is switched on and off. In addition to this, the distance estimation based on the image data of the image formed with infrared light has the three advantages.

The first advantage is that the distance estimation considers diffuse reflection in the same manner as described above. As a result, the distance is estimated with higher precision for the same reasons as described above (not described here).

The second advantage is that the distance estimation is not affected by a difference between the reflectance in a visible light region and the reflectance in an infrared light region. Although the reflectance has been assumed to be a constant in the specification, the reflectance R would actually differ depending on the wavelength $\lambda$. Thus, the reflectance R should actually be written as $R(\lambda)$. In particular, when infrared light is used as the illumination light, the distance estimation needs to consider the reflectance of light that differs depending on the wavelength of the light for the reasons described below.

The distance precision decreases when the reflectance is estimated based on the image data a. This phenomenon will be described first.

The image data a (visible light element) is written as
$C0*R0(\lambda)*\cos(\phi0)$ for the object 0, and
$C1*R1(\lambda)*\cos(\phi1)$ for the person 1, where $R0(\lambda)$ is the reflectance of the visible light of the object 0 and $R1(\lambda)$ is the reflectance of the visible light of the person 1, and $R0(\lambda')$ is the reflectance of the infrared light of the object 0 and $R1(\lambda')$ is the reflectance of the infrared light of the person 1. When illumination variations are eliminated from the image data a, the terms of the illuminations C0 and C1 cancel out. As a result, the estimated reflectance will be written as
$R0(\lambda)*\cos(\phi0)$ for the object 0, and
$R1(\lambda)*\cos(\phi1)$ for the person 1.

Because of reflection occurring in the infrared light region, the image data of the image formed with infrared light (=image data b−image data a) is written as
$B(x0)*R0(\lambda')*\cos(\theta0)$ for the object 0, and
$B(x1)*R1(\lambda')*\cos(\theta1)$ for the person 1.

The distance information obtained based on the image data (=the image data of the image formed with infrared light divided by the estimated reflectance) is written as
$(B(x0)*R0(\lambda')*\cos(\theta0))/(R0(\lambda)*\cos(\phi0))$ for the object 0, and
$(B(x1)*R0(\lambda')*\cos(\theta1))/(R1(\lambda)*\cos(\phi1))$ for the person 1.

Due to the difference between the reflectance in the visible light region and the reflectance in the infrared light region, the terms of the reflectance do not cancel out. The distance precision decreases in this case. The same applies to the image data b. The terms of the reflectance for the image data b do not cancel out.

In contrast, when illumination variations are eliminated from the image data of the image formed with infrared light, which is written as
$B(x0)*R0(\lambda')*\cos(\theta0)$ for the object 0, and
$B(x1)*R1(\lambda')*\cos(\theta1)$ for the person 1,
the terms of the illuminations B(x0) and B(x1) cancel out. The estimated reflectance is written as
$R0(\lambda')*\cos(\theta0)$ for the object 0, and
$R1(\lambda')*\cos(\theta1)$ for the person 1.

The distance information obtained based on the image data (the image data of the image formed with infrared light divided by the estimated reflectance) is written as
$B(x0)$ for the object 0, and
$B(x1)$ for the person 1.

The distance is calculated with high precision without being affected by a difference between the reflectance of the visible light wavelength and the reflectance of the infrared light wavelength.

The third advantage is that the distance precision is less likely to be affected by infrared radiation, which is caused by heat of the subject when, for example, far-infrared light is used as the infrared light.

As it can often be seen in thermographic images, the subject radiates far-infrared light when the subjects generates heat. The reflectance cannot be calculated correctly based on the image data a or the image data b to which the heat element of the subject has been added. As a result, the distance fails to be calculated with high precision. This phenomenon will be described with reference to FIG. 9.

Image signals (infrared elements) of the image data a are written as
$C0*R0(\lambda')*\cos(\phi0)+F0$ for the object 0, and
$C1*R1(\lambda')*\cos(\phi1)+F1$ for the person 1, where F0 is an offset element due to far-infrared radiation of the object 0, and F1 is an offset element due to far-infrared radiation of the person 1.

Image signals (infrared elements) of the image data b are written as
$C0*R0(\lambda')*\cos(\phi0)+B(x0)*R0(\lambda')*\cos(\theta0)+F0$ for the object 0, and
$C1*R1(\lambda')*\cos(\phi1)+B(x1)*R1(\lambda')*\cos(\theta1)+F1$ for the person 1.

The image data of the image formed with infrared light (=image data b−image data a) is written as
$B*(x0)*R0(\lambda')*\cos(\theta0)$ for the object 0, and
$B*(x1)*R1(\lambda')*\cos(\theta1)$ for the person 1.

When illumination variations are eliminated from the image data a, the illuminations C0 and C1 are eliminated. In this case, the estimated reflectance is written as
$R0(\lambda')*\cos(\theta0)+F0$ for the object 0, and
$R1(\lambda')*\cos(\theta1)+F1$ for the person 1.

The distance information calculated based on the image data (the image data of the image formed with infrared light divided by the estimated reflectance) is written as
$(B(x0)*R0(\lambda')*\cos(\theta0))/(R0(\lambda')*\cos(\theta0)+F0)$ for the object 0, and
$(B(x1)*R1(\lambda')*\cos(\theta1))/(R1(\lambda')*\cos(\theta1)+F1)$ for the person 1.

The distance precision decreases in this case due to the offset caused by far-infrared radiation. The same applies to the image data b.

In contrast, when illumination variations are eliminated from the image data of the image formed with infrared light in which an offset caused by far-infrared radiation is eliminated by subtraction processing, which is written as
$B(x0)*R0(\lambda')*\cos(\theta0)$ for the object 0, and
$B(x1)*R1(\lambda')*\cos(\theta1)$ for the person 1, the terms of the illuminations B(x0) and B(x1) cancel out. As a result, the estimated reflectance is written as
$R0(\lambda')*\cos(\theta0)$ for the object 0, and
$R1(\lambda')*\cos(\theta1)$ for the person 1.

The distance information calculated based on the image data (=image data of the image formed with infrared light divided by the estimated reflectance) is written as
$B(x0)$ for the object 0, and
$B(x1)$ for the person 1.

In this manner, the distance is estimated with high precision without being affected by an offset caused by far-infrared radiation.

Figure 9:
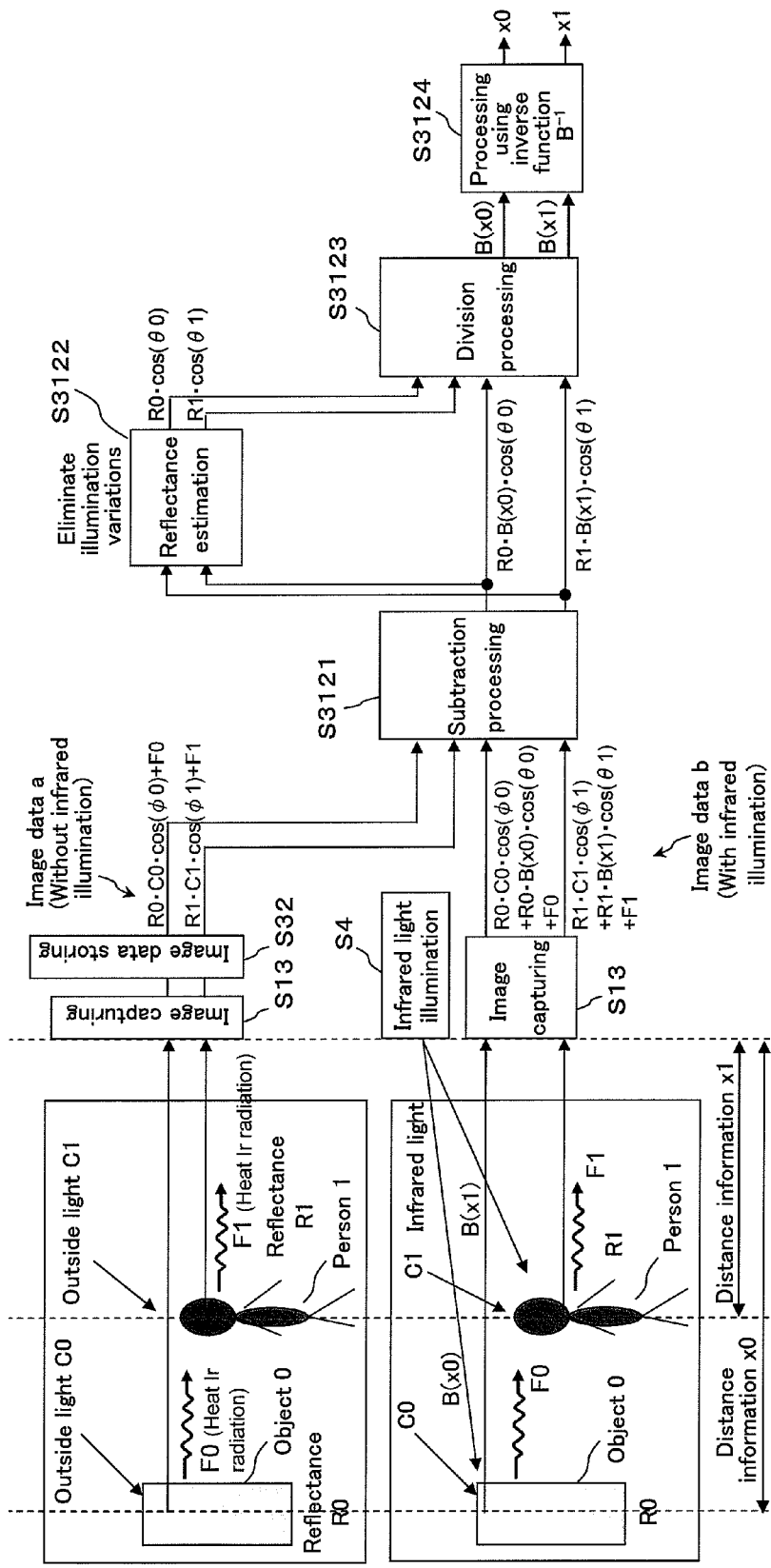
FIG. 9 schematically shows the operation of the imaging apparatus 100 of the first embodiment when the imaging apparatus 100 performs the distance estimation process considering infrared radiation caused by heat of the subject.

With the three advantages described above, it is preferable to estimate the subject reflectance using the image data of the image formed with infrared light illumination in the manner shown in FIGS. 8 and 9.

In step 3, when the subject reflectance is estimated based on the image data of the image formed with flash light, the distance data calculated eventually may be a value obtained by spatially blurring the image data of the image formed with flash light, that is, a value close to the vicinity pixel average value. In this case, the estimated reflectance R(x, y) is calculated with the second method as R(x, y)=I(x, y)/Iave(x, y), where I(x, y) is the image data of the image formed with flash light, and Iave(x, y) is the vicinity pixel average value of the image data. Thus, the quotient data B calculated in step 4 is written as B=I(x, y)/R(x,y)=Iave(x, y).

In this manner, the imaging apparatus 100 may use the image data obtained by spatially blurring the image data of the image formed with flash light as the estimated value of the distance.

Step 5: The Image Processing is Performed Based on the Subject Distance

Two examples of the image processing performed based on the subject distance will now be described.

The image processing for increasing blur of an image will first be described. More specifically, the background of the image is blurred based on the subject distance. In the image processing, a larger low-pass filter is used for a target pixel for which the calculated distance (distance information) is greater.

A maximum filter size FMAX and a maximum distance xMAX are set. According to the distance x, the filter size F(x) is set based on the formula below.

$$F(x)=F\text{MAX}*\{\text{MIN}(x, x\text{MAX})/x\text{MAX}\}$$

Each pixel is then subjected to the low-pass filter processing with the filter size F(x). Through this processing, the imaging apparatus 100 obtains a more blurry image (image data) for a pixel with a greater distance from the imaging apparatus.

The blur produced through the low-pass filter processing differs greatly from blur that can be produced by lenses. The imaging apparatus 100 may perform the processing of emulating the typical blur produced by lenses based on the estimated distance.

The image processing for enabling flash light to reach (processing an image portion with insufficient flash light to have luminance values comparable to those enabled with sufficient flash light) will now be described.

More specifically, the background (background portion) of an image (image data) that is captured with flash light is processed to have high luminance values based on the subject distance (distance information). Based on the distance (distance information) obtained by the imaging apparatus 100, an image portion at a distance greater than or equal to a threshold is determined to be a portion with insufficient flash light. Luminance values of pixels included in the image portion that is determined to be the portion with insufficient flash light are multiplied by the gain or subjected to the processing of adding an offset value. Through such processing, the luminance values of the pixels are converted to higher values. As a result, the image portion that is determined to be the portion with insufficient flash light is converted to an image portion with high luminance values.

The two examples of the image processing described above are performed by, for example, the distance signal processing unit 314 of the imaging apparatus 100.

In addition to the processing for increasing blur and enabling flash light to reach, the imaging apparatus 100 may perform various other processes known in the art performed based on the distance information calculated by the imaging apparatus 100.

As one example, the processing for extracting an object (cutting out a person etc.) is performed with high precision based on distance information calculated by the imaging apparatus 100. With a conventional method, the boundary of an object included in a two-dimensional image is determined based only on the edge or color information etc. The conventional method therefore fails to extract the object with high precision. In contrast, the object is extracted with high precision based on the distance information calculated by the imaging apparatus 100. This consequently increases the precision of high-quality image processing (blur creation, edge enhancement, noise removal, memory color correction, tone level correction, and white balance adjustment), image mixing processing (chroma key), object tracking processing, and operation recognition/analysis.

As another example, the image recognition processing is performed with higher precision based on distance information calculated by the imaging apparatus 100. With the distance information, recesses and projections of the object can be recognized. In this case, the image characteristic amount can be converted in a three-dimensional amount. This improves the precision of the image recognition processing, and improves the precision of processing such as face detection/face recognition, face angle detection, red-eye correction, perspective correction, and image tilt correction.

As still another example, distance information calculated by the imaging apparatus 100 is applicable to multi view coding (MVC). It has been difficult to commercialize multi-view image coding, which conventionally involves processing that requires a large processing load, such as rendering. With the distance information calculated by the imaging apparatus 100, rendering can be performed at high speed.

As still another example, the size of an object in the image can be measured based on distance information calculated by the imaging apparatus 100. The distance information calculated by the imaging apparatus 100 is also useful in the fields of civil engineering and construction.

As still another example, mixed reality (MR) processing for mixing a CG (computer graphics) image with a natural image can be performed with higher precision based on distance information calculated by the imaging apparatus 100. The distance information calculated by the imaging apparatus 100 is also useful in the MR processing. Based on the distance information, a CG object with an appropriate size can be mixed according to the distance to a position at which the CG object is mixed. This enables more natural MR processing to be performed.

As described above, the imaging apparatus 100 of the present invention eliminates illumination variations and estimates the subject reflectance with high precision, and estimates the distance (distance information) between a subject corresponding to each pixel and the imaging apparatus in a three-dimensional space with high precision. The imaging apparatus 100 of the present invention further enables image processing to be performed with high precision using the precisely estimated distance information.

Figure 10:
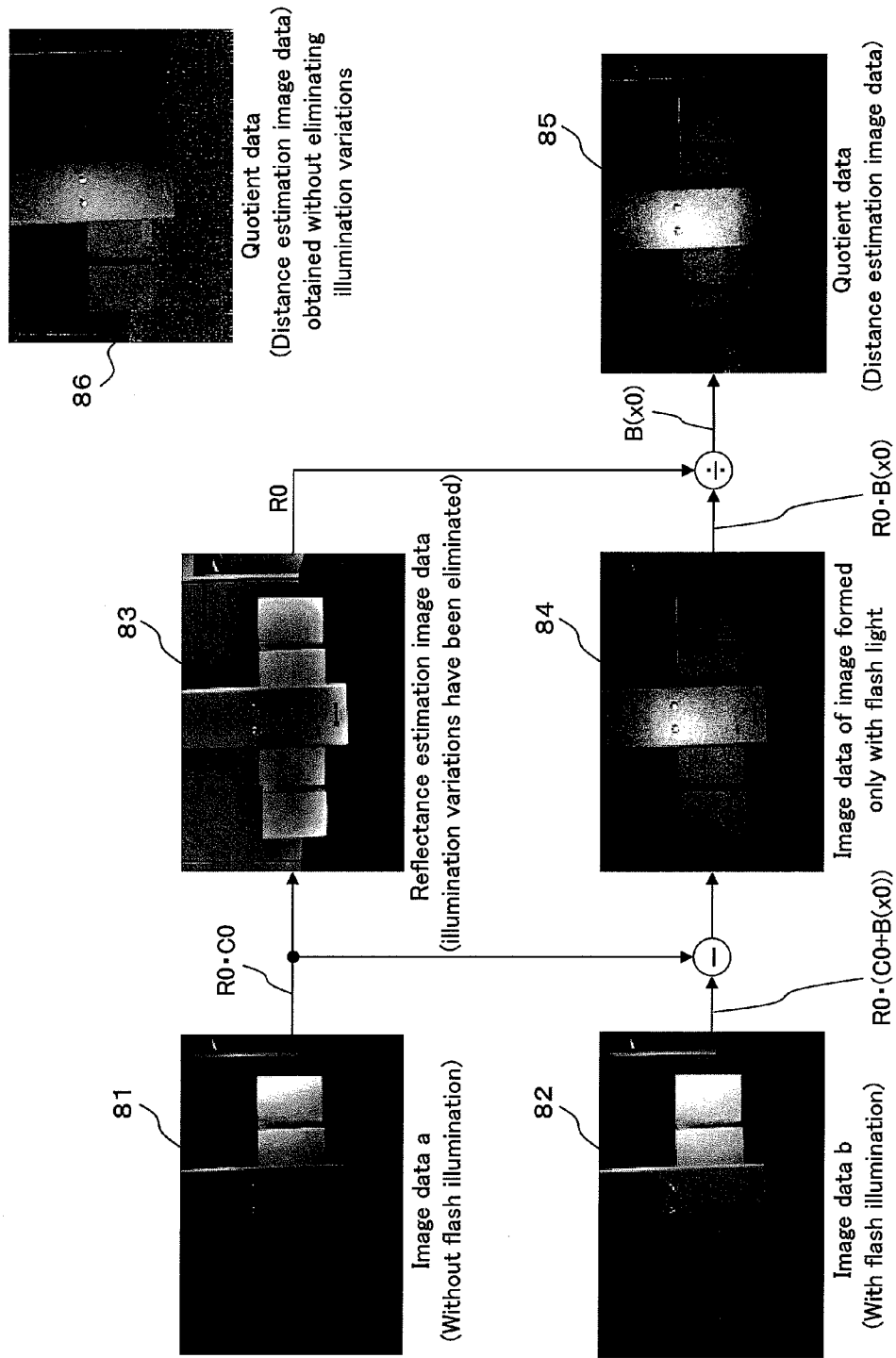
FIG. 10 shows one example of data processed by the imaging apparatus 100 of the first embodiment.

FIG. 10 shows one example of data processed by the imaging apparatus 100. Image data with reference numeral 81 is the image data a obtained by capturing an image without flash light. Image data with reference numeral 82 is the image data b obtained by capturing an image with flash light. Image data with reference numeral 84 is the image data of the image formed with the flash light, which is obtained by subtracting the image data a from the image data b. Image data with reference numeral 83 (reflectance estimation image data) is the image data obtained by eliminating illumination variations from the image data a. Quotient data with reference numeral 85 is the image data obtained by dividing the image data 84 of the image formed with the flash light by the reflectance estimation image data 83.

As shown in FIG. 10, the imaging apparatus 100 obtains the distance estimation image data 85 based on the image data a and the image data b. The distance estimation image data 85 indicates distance information.

Image data with reference numeral 86 is the quotient data (distance estimation image data) obtained with the method described in, for example, Patent Citation 1 without eliminating illumination variations. When illumination variations are not eliminated from image data, objects that are at the same distance may be erroneously determined to be at different distances. In this manner, the distance estimation may be performed erroneously.

Modifications

The signal processing unit 31 may be replaced by a signal processing unit 31' as shown in FIG. 3. The signal processing unit 31' inputs, as image data b, an image signal (image data) output from the first signal processing unit 311 into the distance estimation unit 312. This structure eliminates the need for capturing an image without flash light. Image data corresponding to a live view image, which is displayed on a view finder immediately before the shutter button (not shown) of the imaging apparatus 100 is pressed, is used as the image data b and is input into the distance estimation unit 312. Thereafter, the imaging apparatus 100 calculates (estimates) distance information through the same processing as described above.

This structure further reduces a difference between the timing at which an image is captured without flash light (live view image displayed on the view finder immediately before the shutter button is pressed) and the timing at which an image is captured with flash light. In this case, the images are less likely to be affected by movement of the subject between the two images.

Other Embodiments

In the above embodiments, each block of the imaging apparatus may be formed by a single chip with semiconductor device technology, such as LSI (large-scale integration), or some or all of the blocks of the imaging apparatus may be formed by a single chip.

Although the semiconductor device technology is referred to as LSI above, the technology may be instead referred to as IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the imaging apparatus. Biotechnology is potentially applicable.

The processes described in the above embodiments may be realized using either hardware or software, or may be realized using both software and hardware. When the imaging apparatus of the above embodiments is realized by hardware, the timings at which each of the above processes is performed need to be adjusted. For ease of explanation, the timing adjustment of various signals generated in an actual hardware design is not described in the above embodiments.

The structures described in detail in the above embodiments are mere examples of the present invention, and may be changed and modified variously without departing from the scope and spirit of the invention.

INDUSTRIAL APPLICABILITY

The imaging apparatus, the imaging method, the program, the storage medium, and the integrated circuit of the present invention enable the distance to a subject to be estimated with high precision by performing conversion with input and output characteristics that differ depending on a vicinity average luminance and eliminating illumination variations and estimating the reflectance of the subject when estimating the distance from each pixel of a captured image to the subject using illumination. The imaging apparatus, the imaging method, the program, the storage medium, and the integrated circuit of the present invention are enabled with a simple structure, and therefore are applicable to compact digital cameras and video cameras.

What is claimed is:

1. An imaging apparatus comprising:
    an illumination unit operable to illuminate a subject with illumination light;
    an imaging unit operable to switch an illumination state of the illumination unit within a predetermined time and obtain a first image signal in a state without the illumination light and a second image signal in a state with the illumination light;
    an illumination light element obtaining unit operable to obtain an image signal of an image formed with an element of the illumination light by reducing an element of the first image signal from the second image signal;
    a reflectance estimation unit operable to reduce illumination variations from one of the first image signal, the second image signal, and the image signal of the image formed with the illumination light element by converting a luminance value $Ki$ of a target pixel using an input and output characteristic that differs depending on an average luminance value $AKi$ of vicinity pixels of the target pixel, and estimate a reflectance of the subject corresponding to the target pixel and thereby obtain a reflectance indicative signal; and
    a distance information estimation unit operable to reduce an element of the reflectance indicative signal from the image signal of the image formed with the illumination light element, and estimate distance information about a distance to the subject corresponding to the target pixel and thereby obtain a distance information indicative signal.

2. The imaging apparatus according to claim 1, wherein the reflectance estimation unit converts the luminance value $Ki$ to a luminance value in a predetermined range when the luminance value $Ki$ and the average luminance value $AKi$ are equal to each other.

3. The imaging apparatus according to claim 1, wherein when the luminance value $Ki$ and the average luminance value $AKi$ are equal to each other, the reflectance estimation unit converts the luminance value $Ki$ to a luminance value that is within a range of $KoCent - Range * 0.3$ to $KoCent + Range * 0.3$,
    where Range is a range of possible luminance values to which the luminance value $Ki$ is converted, and KoCent is a center value of the range Range.

4. The imaging apparatus according to claim 1, wherein the reflectance estimation unit reduces illumination variations by dividing the luminance value Ki by the vicinity average luminance value AKi and thereby obtains the reflectance indicative signal.

5. The imaging apparatus according to claim 1, wherein the reflectance estimation unit obtains the reflectance indicative signal based on the image signal of the image formed with the illumination light element.

6. The imaging apparatus according to claim 1, wherein flash light is used as the illumination light.

7. The imaging apparatus according to claim 1, wherein infrared light is used as the illumination light.

8. The imaging apparatus according to claim 1, further comprising:
an inverse-function processing unit operable to convert the distance information indicative signal obtained for the pixel to a signal indicating a distance to the subject corresponding to the pixel using an inverse function $B^{-1}(x)$ of a function $B(x)$, where the function $B(x)$ indicates an attenuation characteristic of the illumination light over distance, and x is the distance to the subject.

9. The imaging apparatus according to 8, further comprising:
a distance signal processing unit operable to subject the image signal to processing for enhancing a depth based on the distance information indicative signal.

10. The imaging apparatus according to claim 8, further comprising:
a distance signal processing unit operable to subject the image signal to processing for blurring a background based on the distance information indicative signal.

11. The imaging apparatus according to claim 8, further comprising:
a distance signal processing unit operable to detect an image portion of the image to which the illumination light fails to reach sufficiently based on the distance information indicative signal, and perform processing for increasing a luminance value of the pixel included in the image portion.

12. A non-transitory computer readable storage medium storing a program used in an imaging apparatus including an illumination unit operable to illuminate a subject with illumination light, and an imaging unit operable to switch an illumination state of the illumination unit within a predetermined time and obtain a first image signal in a state without the illumination light and a second image signal in a state with the illumination light, the program enabling a computer to function as:
an illumination light element obtaining unit operable to obtain an image signal of an image formed with an element of the illumination light by reducing an element of the first image signal from the second image signal;
a reflectance estimation unit operable to reduce illumination variations from one of the first image signal, the second image signal, and the image signal of the image formed with the illumination light element by converting a luminance value Ki of a target pixel using an input and output characteristic that differs depending on an average luminance value AKi of vicinity pixels of the target pixel, and estimate a reflectance of the subject corresponding to the target pixel and thereby obtain a reflectance indicative signal; and
a distance information estimation unit operable to reduce an element of the reflectance indicative signal from the image signal of the image formed with the illumination light element, and estimate distance information about a distance to the subject corresponding to the target pixel and thereby obtain a distance information indicative signal.

13. An integrated circuit comprising:
an illumination unit operable to illuminate a subject with illumination light;
an imaging unit operable to switch an illumination state of the illumination unit within a predetermined time and obtain a first image signal in a state without the illumination light and a second image signal in a state with the illumination light;
an illumination light element obtaining unit operable to obtain an image signal of an image formed with an element of the illumination light by reducing an element of the first image signal from the second image signal;
a reflectance estimation unit operable to reduce illumination variations from one of the first image signal, the second image signal, and the image signal of the image formed with the illumination light element by converting a luminance value Ki of a target pixel using an input and output characteristic that differs depending on an average luminance value AKi of vicinity pixels of the target pixel, and estimate a reflectance of the subject corresponding to the target pixel and thereby obtain a reflectance indicative signal; and
a distance information estimation unit operable to reduce an element of the reflectance indicative signal from the image signal of the image formed with the illumination light element, and estimate distance information about a distance to the subject corresponding to the target pixel and thereby obtain a distance information indicative signal.

14. An integrated circuit used in an imaging apparatus including an imaging unit operable to switch an illumination state within a predetermined time and obtain a first image signal in a state without the illumination light and a second image signal in a state with the illumination light, the integrated circuit comprising:
an illumination light element obtaining unit operable to obtain an image signal of an image formed with an element of the illumination light by reducing an element of the first image signal from the second image signal;
a reflectance estimation unit operable to reduce illumination variations from one of the first image signal, the second image signal, and the image signal of the image formed with the illumination light element by converting a luminance value Ki of a target pixel using an input and output characteristic that differs depending on an average luminance value AKi of vicinity pixels of the target pixel, and estimate a reflectance of the subject corresponding to the target pixel and thereby obtain a reflectance indicative signal; and
a distance information estimation unit operable to reduce an element of the reflectance indicative signal from the image signal of the image formed with the illumination light element, and estimate distance information about a distance to the subject corresponding to the target pixel and thereby obtain a distance information indicative signal.

15. An imaging apparatus comprising:
a reflectance estimation unit operable to receive image data and obtain a reflectance for a target spatial position of the image data; and
a distance information estimation unit operable to output distance information corresponding to the target position using a luminance value of a predetermined position of the image data and the reflectance obtained for the target position, wherein the reflectance estimation unit obtains a vicinity average luminance value based on luminance values of image signals corresponding to vicinity positions of the target position, and outputs a relative value of the luminance value obtained for the vicinity luminance value as the reflectance for the target position, and wherein the reflectance estimation unit is a two-dimensional lookup table that receives the vicinity luminance value and the luminance value and outputs the relative value.

16. The imaging apparatus according to claim 15, further comprising:

a flash illumination unit operable to perform flash light illumination; and a subtraction unit operable to output difference image data corresponding to a difference between first image data obtained with the flash light illumination and second image data obtained without the flash light illumination, wherein the reflectance estimation unit receives the difference data as the image data.

17. An imaging method comprising:

illuminating a subject with illumination light;

switching an illumination state of the illumination by the illuminating step within a predetermined time and obtaining a first image signal in a state without the illumination light and a second image signal in a state with the illumination light;

obtaining an image signal of an image formed with an element of the illumination light by reducing an element of the first image signal from the second image signal;

reducing illumination variations from one of the first image signal, the second image signal, and the image signal of the image formed with the illumination light element by converting a luminance value $K_i$ of a target pixel using an input and output characteristic that differs depending on an average luminance value $AK_i$ of vicinity pixels of the target pixel, and estimating a reflectance of the subject corresponding to the target pixel and thereby obtain a reflectance indicative signal; and reducing an element of the reflectance indicative signal from the image signal of the image formed with the illumination light element, and estimating distance information about a distance to the subject corresponding to the target pixel and thereby obtain a distance information indicative signal.

* * * * *